United States Patent
Merritt et al.

[11] Patent Number: 6,041,335
[45] Date of Patent: Mar. 21, 2000

[54] METHOD OF ANNOTATING A PRIMARY IMAGE WITH AN IMAGE AND FOR TRANSMITTING THE ANNOTATED PRIMARY IMAGE

[76] Inventors: Charles R. Merritt; Bonnie M. Merritt, both of 1116 Fairview Ave., San Jose, Calif. 95125

[21] Appl. No.: 08/798,519

[22] Filed: Feb. 10, 1997

[51] Int. Cl.⁷ .................................................. G06F 17/00
[52] U.S. Cl. ........................................................ 707/512
[58] Field of Search ................................... 707/512, 517, 707/526, 530; 364/142; 395/200.34; 382/256, 282, 277; 345/121, 118, 112, 113; 709/204, 203

[56] References Cited

U.S. PATENT DOCUMENTS

| | | | |
|---|---|---|---|
| Re. 34,476 | 12/1993 | Norwood .................................. | 382/13 |
| 5,119,319 | 6/1992 | Tanenbaum ............................. | 364/514 |
| 5,185,818 | 2/1993 | Warnock ................................. | 382/54 |
| 5,231,578 | 7/1993 | Levin et al. ............................ | 364/419 |
| 5,283,560 | 2/1994 | Bartlett .................................. | 340/113 |
| 5,299,307 | 3/1994 | Young .................................... | 395/161 |
| 5,301,359 | 4/1994 | Van den Heuvel et al. ........... | 455/56.1 |
| 5,481,645 | 1/1996 | Bertino et al. ........................ | 395/2.79 |
| 5,499,036 | 3/1996 | Hauck .................................... | 345/3 |
| 5,502,727 | 3/1996 | Catanzaro et al. ..................... | 370/94.2 |
| 5,559,942 | 9/1996 | Gough et al. .......................... | 395/155 |
| 5,761,682 | 6/1998 | Huffman et al. ...................... | 707/500 |

*Primary Examiner*—Joseph H. Feild
*Assistant Examiner*—Alford W. Kindred

[57] ABSTRACT

A method of superimposing a secondary, graphical image on a primary image for annotating the primary image is provided. The secondary image is opened to access underlying information attached thereto, referred to as an annotation. The annotation communicates information that preferably pertains to the primary image. Annotations can be sorted and ordered by criteria including date and author. Preferably, position, shape, form, color, and animation provide information about the secondary image. The secondary image is displayed over the primary image as either a mark or glyph. The glyph is a pictographic icon that conveys information by its position on the primary image and its type. The mark is a simple glyph. A glyph or mark is opened by users enabling the users to annotate the primary image with their annotations. A plurality of marks and glyphs displayed on the primary image are initialized for viewing and inputting annotations and terminated for hiding the annotations, so that the annotations do not interfere with viewing the image. The invention enables users to either sequentially, or in parallel, review and annotate the primary image.

14 Claims, 13 Drawing Sheets

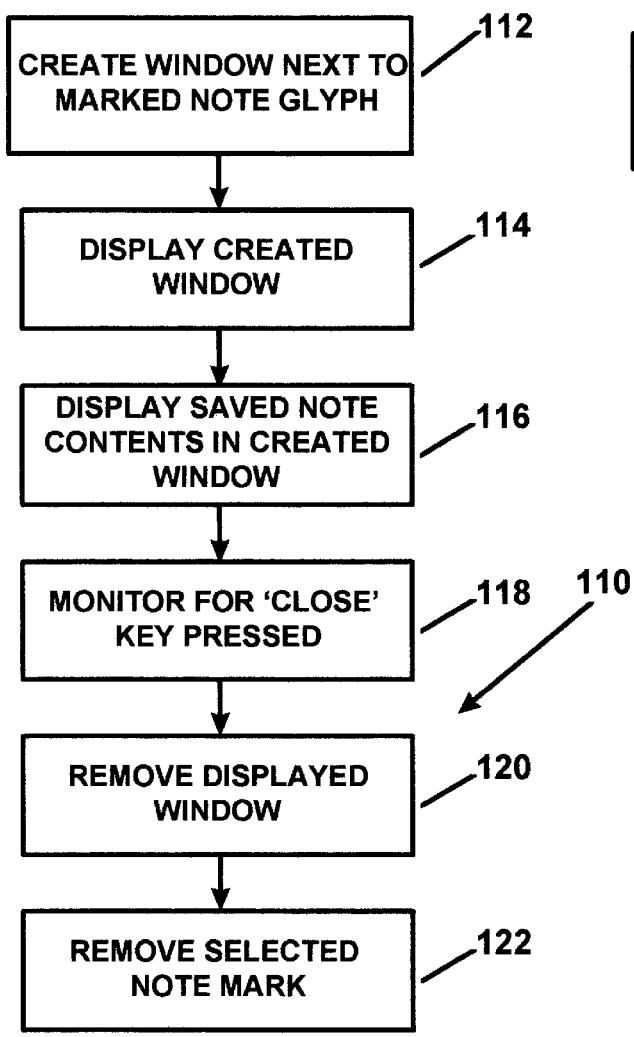
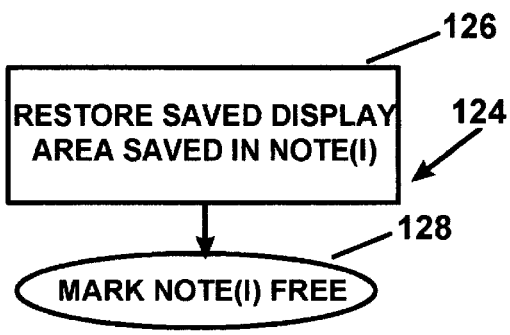
FIG. 11
FIG. 10

FIG. 13   * SEE IDM_HIDENOTES

METHOD OF ANNOTATING A PRIMARY IMAGE WITH AN IMAGE AND FOR TRANSMITTING THE ANNOTATED PRIMARY IMAGE

BACKGROUND OF THE INVENTION

1. Field of the Invention

The present invention relates generally to systems for manipulating data generated by computer software programs and displayed on a computer monitor screen, and more particularly, to a method of superimposing a graphical image on a primary image for annotating the primary image so that the graphical image conveys information about the primary image.

2. Description of Related Art

In the worldwide business community, communication between individuals or groups of individuals that does not require face-to-face interaction is becoming increasingly important. With the increasing sophistication and popularity of personal computers and world wide computer networks, such as the INTERNET and the WORLD WIDE WEB, communication, such as meetings, between a number of individuals located at a plurality of geographically remote locations is expanding. Computers comparably equipped with commercially available communication hardware such as an ETHERNET data interface, ISDN port, or modem, that allows data transmission between the comparably equipped computers, are emerging as a means for facilitating communications, such as teleconferences between geographically remote locations. Additionally, support for threaded communications, wherein all parties in a desired discussion are not simultaneously participating in the discussion, and which does not require travel, expensive communication systems and equipment, or extensive training is desired by the business community.

Known teleconferencing and communication systems typically require expensive, dedicated, and proprietary computer hardware and software at each remote location participating in the conference. Further, parties participating in the conference at each remote location, must be in attendance at each location while the conference is being conducted. Simultaneous attendance of the parties increases the complexity of hardware, software, and scheduling of the attendees which adds to the expense and inconvenience of teleconference meetings.

Often teleconferencing and similar communication types are limited to either phone lines or a Local Area Network (LAN). The necessity for either expensive dedicated and proprietary hardware or software, or combinations thereof, has limited the attractiveness of these communication systems as a cost effective communications tool. Since these systems typically operate in closed environments, where lower cost commercially available hardware and software are prevented from integrating into the system, maintenance adds to the high cost thereof.

In addition to the low cost feature provided by networking computers, a network of computers affords another advantage over proprietary teleconferencing systems. Any conference participant potentially has the capability to transmit an image displayed on the screen of their computer's monitor to the other members of the meeting. This image may be created by manipulating data on a senders computer to form the image. It would be advantageous to enable the sender to annotate the image with relevant commentary, then transmit the annotated image to the other members of the meeting. After transmission of the annotated image, participants of the meeting can then discuss the annotated image with the sender, since each participant is viewing the annotated image.

In traditional meetings, a speaker stands in front of an audience and utilizes an overhead projector, for example, to project on a screen some set of prepared visual slides, often called foils or transparencies. During the discussion, the speaker marks up the transparencies in response to comments or questions, which results in transparencies that become increasingly difficult to read. Additionally, when the transparency is removed from the projector, members of the audience either mark their own copy of the slide, which is usually paper, or prodigious notes need to have been taken on what the marks meant.

With increasing regularity, these transparencies are often generated by a computer. In striving for a "paper-less" workplace, it would be advantageous to provide a presentation means that directly utilizes the computer for more than just document generation.

There have been a number of attempts in the prior art toward achieving these goals. Image annotation systems in the prior art often include the disadvantageous feature of simply overlaying textual information on a primary image. The overlaying textual information or notes tends to substantially obscure the underlying image and lacks annotation position, type, and annotation sorting information that can be conveyed with graphics, color coding, graphic display, or blinking, for example. Several prior art annotation systems further lack the ability to transmit the annotation information across communication lines such as the Internet, the World Wide Web, or LANs.

One such prior art attempt of an image annotation system is disclosed in U.S. Pat. No. 5,231,578, to Levin et al., which is directed to an apparatus for document annotation and manipulation using images from a window source. Disclosed therein is a data processing system that provides annotation of a document through an electronic tablet, keyboard, and an audio assembly. A document to be annotated is generated by a window generated by a multiwindow program running on the processing system. The annotatable document may be also generated from a whole screen view of overlapping windows produced by the multiwindow program. Annotated documents may be stored and retrieved in a database of the multiwindow support program.

U.S. Pat. No. 5,283,560, to Bartlett, is directed to a computer system and method for displaying images with superimposed partially transparent menus. The computer has an operating system that generates and displays a first set of images on a display screen and a menu generating program that displays a control menu comprising a partially transparent stippled image having a list of menu items. When the control menu is superimposed over the first set of images, the first set remains visible on the display below the control menu. The menu generating program logically ANDs predefined control menu images with a halftone screen to generate the stippled control menu.

U.S. Pat. No. RE. 34,476, to Norwood, discloses a hybrid information management system for handwriting and text recognition. The disclosed system is used with special input hardware that provides the benefits of computerization to handwritten as well as keyboard entered information. The input hardware consists of a transparent digitizing table mounted atop a flat panel display screen, such that a user can handwrite directly upon the display screen with the pen. This process closely mimics how people annotate paper documents using hand written notes.

However, a disadvantage of the disclosed system is, that using handwritten comments superimposed on displayed graphical images could result in commentary that is virtually unreadable and potentially interferes with details of the graphical image itself. Another disadvantage of the system is that screen capture is limited to the display area and accommodates only those images that are generated by the software disclosed therein. A further disadvantage of the device, is that there is no provision for marking an annotation on the display using a small secondary image whose position, among additional aspects thereof, relative to the displayed image is meaningful.

U.S. Pat. No. 5,119,319, to Tanenbaum, is directed to a full-duplex video communication system. Described by Tanenbaum are terminals that each include dedicated hardware that consists of a transmitter, a receiver, control means, input means, and display means, and computer software for operating the system. The control means enables changing of each display at each remote terminal in real-time, so that each terminal is displaying the same information at the same time. Thus, users at each terminal can interact with other users at the other terminals without having to wait for one user to complete entry of information. However, a disadvantage of the disclosed system is that there is no accommodation for utilizing distinct, secondary images generated by independent processing, annotating the display with the secondary images, and then replicating the annotated display among the set of participating display means. Another disadvantage is that all participants must be available at the same time.

U.S. Pat. No. 5,481,654, to Bertino et al., is directed to a portable computer with verbal annotations. The computer comprises a voice conversion unit and a hard disc for data storage. An annotation command permits the visual display on a screen and the leaving in the text of a linkage track for a verbal insert datum.

U.S. Pat. No. 5,299,307, to Young, discloses controls for drawing images on computer displays; U.S. Pat. No. 5,502,727, to Cantanzaro et al., discloses an image and audio communication system having graphical annotation capability; U.S. Pat. No. 5,499,036, to Hauck, discloses a display control apparatus and method of using same; U.S. Pat. No. 5,185,818, to Warnock, discloses a method of substituting fonts and displaying characters; and U.S. Pat. No. 5,301,359, to Van Den Heuvel et al., discloses a bulletin board resource for communication system access.

While the above enumerated prior art references have improved features, it would be advantageous to provide a method of superimposing a graphical image on a primary image for annotating the primary image so that the graphical image conveys information about the primary image and to add annotations to be shared among a work-group.

OBJECTS OF THE INVENTION

It is therefore an object of the present invention to provide a method of superimposing a graphical image on a primary image for annotating the primary image so that the graphical image allows users to communicate information about the primary image;

It is another object of the present invention to provide a method of superimposing a graphical image on a primary image that generates the primary image by capturing all or any portion of an image displayed on a screen of the user's computer regardless of the application program running on the computer that generates the image;

It is a further object of the present invention to provide a method of superimposing a graphical image on a primary image for annotating the primary image, wherein the graphical image conveys information about the primary image by means including its position on the primary image, shape, graphical form, color, and animation;

It is still another object of the present invention to provide a method of superimposing a graphical image on a primary image for annotating the primary image, wherein the graphical image is opened to provide textual, audio, graphical, or video information regarding the primary image;

It is yet a further object of the present invention to provide a method of superimposing a graphical image on a primary image for annotating the primary image, wherein the graphical image can be selected according to a criteria;

It is another object of the present invention to provide a method for linking the primary image, the superimposed secondary image, and the annotation;

It is another object of the present invention to provide a method for transmitting an annotated primary image to subsequent users for subsequent annotation of the primary image by the subsequent users with the subsequent annotations indicated with distinct graphical images representative of each of the subsequent users; and It is a still further object of the present invention to provide a method of superimposing a graphical image on a primary image for annotating the primary image that does not substantially obscure the underlying primary image for viewing the primary image.

SUMMARY OF THE INVENTION

These and other objects and advantages of the present invention are achieved by providing a method of superimposing a secondary, graphical image on a primary image for annotating the primary image. The secondary image is opened to access underlying information attached thereto, referred to as an annotation. The annotation communicates information, such as a textual note, graphic, or audio data which is commentary or an explanation that preferably pertains to the primary image. Annotations can be sorted and ordered by criteria including date or author, for instance. In the preferred embodiment, several different means are provided to indicate information about the secondary image. The indicating means preferably include position of the secondary image with respect to the primary image, shape of the graphic, form thereof, color, and animation of the secondary image.

In the present invention, the secondary image is displayed over the primary image in either of two preferred types. The first type is referred to as a "glyph" and the second type is referred to as a "mark". In the preferred embodiment, the glyph is any suitable type of graphic icon that conveys its information by its position on the primary image and its type by the graphical form of the glyph. The glyph may comprise any one of a number of known iconic graphical forms or may comprise a unique graphical form created by the user. The mark is a non-intrusive glyph, a simple iconic graphic, such as a small rectangular icon for example. Each mark icon conveys the location of the mark by the icon's position on the primary image. An annotation type can be associated with a glyph or mark to facilitate selection.

The annotations for the glyphs and marks, are produced by the present invention as opposed to the application program running on the computer. The annotations can be generated by an end user, attached to a glyph or mark, and generated prior to distributing the method of the present invention.

A glyph or mark on the primary image is initialized by a user to enable the user to annotate the primary image with their own comments. Further, subsequent users can open the glyph or mark and view annotations input by one or more previous users and append their own annotations. Thus, the glyph affords a number of different comments, or string of annotations, to be directed toward a particular aspect of the primary image, indicated by the glyph or mark.

A plurality of glyphs or marks, or both, can be displayed on the primary image for annotation thereof. The marks and glyphs are opened for viewing and inputting annotations and can be hidden, so that the annotations do not interfere with viewing the primary image. Additionally, either glyphs or marks may be displayed, or selected glyphs and marks may be selectively displayed. The glyphs and marks can be displayed according to criteria such as glyph, mark, date, author, and the like. The glyphs and marks enable a plurality of users to make annotations to the primary image, from a predefined set of glyphs or marks, user created glyphs or marks, the user creatable annotations linked to the glyphs or marks, for providing a wide range of commentary on the primary image. Further, predefined sets of glyphs and marks are provided with the method of the present invention, with the capability afforded by the invention of enabling the user to generate their own customized glyphs and marks.

The preferred embodiment of the present invention enables a number of different users, such as users in a threaded discussion for example, to review and annotate the primary image, using either glyphs, marks, or both. A first user of the invented method generates an image they desire to capture by running any chosen application program on their computer. The program generates an image on the screen of their computer's monitor. The user then captures all or some desired portion of the image displayed on the screen using the invented method to link glyphs, marks, and annotations to the primary image. The primary image can be any image that the user desires to capture, such as a portion of text, computer generated drawing, or any other desired image.

The first user then transmits the primary image which can be annotated by the first user, to one or more subsequent users of the invented method to enable the subsequent users to annotate the primary image. The primary image can be transmitted to the subsequent users with known and emerging computer communications tools including LANs and the Internet, for example. Several different methods can be used for transmitting the annotated primary image to subsequent users.

One desired method for transmitting the primary image would comprise the first user transmitting the primary image in parallel to each subsequent user in a routing list. The subsequent users can then review the primary annotated image and input their annotations or append to annotations of the primary image using glyphs and marks. The annotations may consist of textual, video, or audio comments for example. After the subsequent users have added their comments regarding the image with annotations, the annotated primary image is transmitted back to the first user. The first user then reviews the annotated image by opening the glyphs or marks and viewing the annotations generated by each user. The first user can then take any actions indicated by the annotations on the primary image, such as editing a text document which was used to create the primary image, or any other appropriate actions indicated by the annotations.

Another preferable method for transmitting the primary image comprises the first user transmitting the primary image sequentially to subsequent users in a routing list. Using this method, the first user transmits the primary image to a first subsequent user, indicated in the routing list, so that they can review the primary image and input their annotations using the glyphs or marks by adding new annotations identified by a glyph or mark, or appending to an existing annotation identified by a glyph or mark. After review by the subsequent user, the annotated primary image is transmitted to the next subsequent user for their review and annotation input. The string of subsequent users continues in a threaded discussion type communication format, until the repeatedly annotated primary image reaches a last one of the subsequent users, which is the first user. The first user can then act on the annotated primary image as previously discussed. Additionally, the discussed methods of image transmission can be combined in any suitable combination desired by the users, so long as each desired user can review the primary image and add their annotations or append to existing annotations thereto.

In use, the method of the present invention presents each user with a menu of options selectable using a computer input device, such as a mouse or keyboard. One of the selectable options presents a menu of choices relating to capturing the displayed image for generating the primary image. The menu choices for capturing the displayed image include capturing a specified window, capturing the entire screen, and capturing a user-specified area of the display.

When capturing a specified window, the user selects the choice of specifying the display area that is to be captured. The screen cursor is altered to allow the user to define a rectangular area on the screen. The user then draws a rectangular area on the screen, in which the screen area within the boundary of the rectangle is captured and displayed in a separate window indicating the newly generated primary image.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

FIG. 10 is a flow diagram of an annotation read module of the invented method;

FIG. 11 is a flow diagram of an annotation delete module of the present invention;

DESCRIPTION OF THE PREFERRED EMBODIMENTS

The following description is provided to enable any person skilled in the art to make and use the invention and sets forth the best modes presently contemplated by the inventors of carrying out their invention. Various modifications, however, will remain readily apparent to those skilled in the art, since the generic principles of the present invention have been defined herein.

Figure 1:
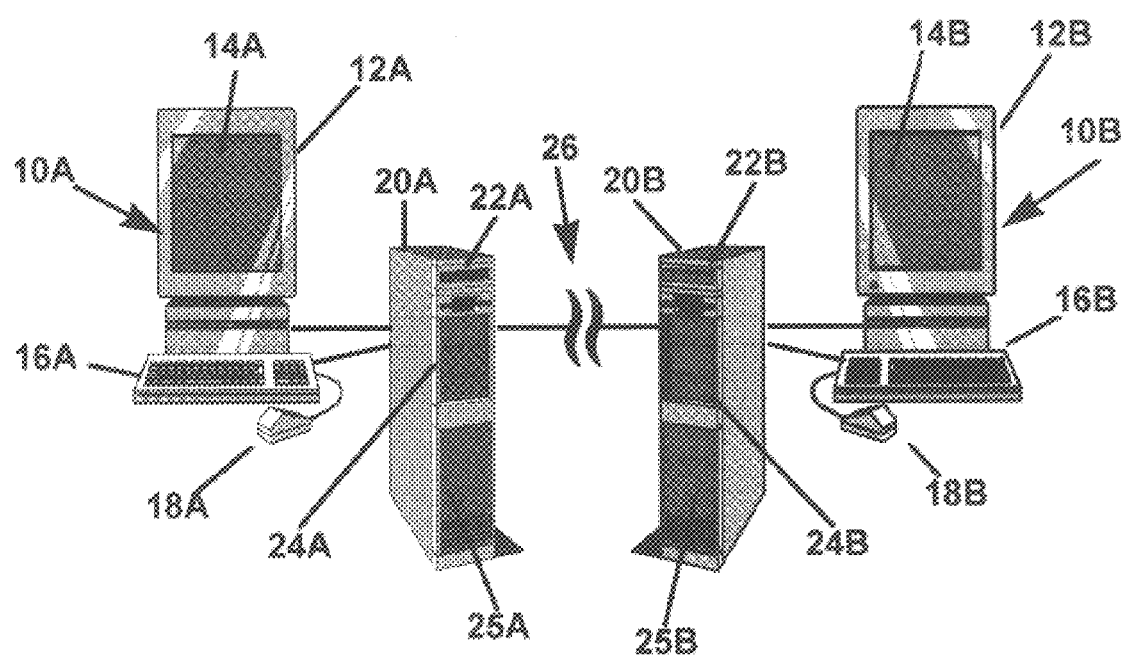
FIG. 1 is a schematic view of interconnected computers capable of embodying the method of the preferred embodiment of the present invention.

Referring now to FIG. 1 of the drawings there is shown, generally at 10A and 10B, a pair of interconnected computers, representative of a computer network which may comprise a vast number of such computers 10, capable of embodying the method of the preferred embodiment of the present invention. The computers 10A, 10B may operate on any commercially available data processing platform, under any suitable operating system. Each computer 10A, 10B typically includes a monitor 12A, 12B, having a screen 14A, 14B for viewing images generated by the computer 10A, 10B, and input means including a keyboard 16A, 16B and mouse 18A, 18B. The computer 10A, 10B also includes a housing 20A, 20B that typically retains a data storage device such as a hard disk 22A, 22B, memory means 24A, 24B, and a CPU 25A, 25B for data processing.

The computers 10A, 10B are interconnected, shown schematically at 26, using any known means that enables the transmission of data therebetween, for configuring a network of such computers 10 for example. The computers 10A, 10B may be interconnected in a business complex using a Local Area Network (LAN), or they may be located at geographically remote locations and interconnected via known computer networks, such as the INTERNET and the WORLD WIDE WEB. The computers 10A, 10B are provided with appropriate commercially available data transmission hardware (not shown), such as an ETHERNET data interface, ISDN port, or modem, for example.

Referring now to FIGS. 1–5 of the drawings, the present invention provides a method of superimposing a secondary, graphical image on a primary image for annotating the primary image. The secondary image is opened to access underlying information attached thereto, referred to as an annotation. The annotation communicates information, such as a textual note, graphic, or audio data which is commentary or an explanation that preferably pertains to the primary image. Annotations can be sorted and ordered by criteria including date or author, for instance.

A displayed image, shown generally at 30, is generated by an application program displayed on the screen 14 of the monitor 12 while the computer 10 is running the program. The image 30 may be generated by any program running on the computer 10, including word processing programs, computer aided drafting programs, and desktop publishing programs, for example, wherein the image 30 may comprise text 32, graphics 34, or any combination thereof. In use, a user performs data processing on the computer 10 using the keyboard 16 and mouse 18, for generating the image 30. As shown, the user has generated a memo that comprises both text 32 and graphics 34, with a commercially available desktop publishing program for instance.

If the user desires to transmit the displayed image 30, the user invokes the invented method, which may be stored on the computer's hard disk 22 and called into memory 24 for processing by the CPU 25. The method links the captured image 30 to generate a primary image 36. Once the primary image 36 is generated, one or more such images 36 is transmitted to one or more subsequent users so that they can make annotations 52 to the primary image 36, regarding the information conveyed thereby. Annotations 52 are made to the primary image 36 by superimposing secondary, graphical image 40, 42 on the image 36 for annotating the primary image 36. The secondary images 40, 42 are opened to access underlying information attached thereto, referred to as an annotation 52.

Annotations 52 communicate information, such as a textual note 51, graphic, or audio data which is commentary or an explanation that preferably pertains to the information conveyed in the primary image 36. Annotations 52 can be sorted and ordered by criteria including date or author, for instance. In the preferred embodiment, several different means are provided to indicate information about the secondary images 40, 42. The indicating means preferably include position of the secondary image 40, 42 with respect to the primary image 36, shape of the graphic, form thereof, color, and animation of the secondary image 40, 42.

In the present invention, the secondary image 40, 42 is displayed over the primary image 36 in either of two preferred types. A first type 40 is referred to as a "glyph" and a second type 42 is referred to as a "mark". In the preferred embodiment, the glyph 40 is any suitable type of pictographic icon that conveys its information by its position on the primary image 36 and its type by graphical form. The glyph 40 may comprise any one of a number of known iconic graphical forms or may comprise a unique graphical form created by the user. The mark 42 comprise non-intrusive, simple iconic glyph, such as a small rectangular icon for example. Each mark icon 42 conveys the location of the mark 42 by the icon's position on the primary image 36 and its annotation type by the color for example of the icon 42. In the present invention, sets of different marks 42 may be grouped by color, with specific colored marks 42 selected to annotate corresponding specific meaning about the image 36.

A glyph 40 or mark 42 is opened by a user to enable the user to annotate the primary image 36 with their own annotations 52. Further, subsequent users can open the glyph 40 or mark 42 and view annotations 52 input by one or more previous users and append or add their own annotations 52. Thus, the glyph 40 or mark 42 affords a number of different comments, or string of annotations 52, to be directed toward a particular aspect of the primary image 36, indicated by the glyph 40 or mark 42.

A plurality of glyphs 40 or marks 42, or both, can be displayed on the primary image 36 for annotation thereof. The glyphs 40 and marks 42 are opened for viewing and inputting annotations 52 and hidden for hiding the annotations, so that the annotations 52 do not interfere with viewing text 32 or graphics 34 in the primary image 36. Additionally, either glyphs 40 or marks 42 may be displayed, or selected glyphs 40 and marks 42 may be selectively displayed while others are hidden. The glyphs 40 and marks 42 can be displayed according to criteria such as date, author, and the like. The glyphs 40 and marks 42 enable a plurality of users to make annotations 52 to the primary image 36 by the user creatable annotations 52 linked to the glyphs 40 or marks 42, for providing a wide range of commentary on the image 36. Further, predefined sets of glyphs 40 and marks 42 are provided with the method of the present invention, and the capability of enabling the user to generate their own customized glyphs 40 and marks 42 is afforded by the invention.

The annotations 52 are produced by the present invention as opposed to the application program running on the computer 10 generating the annotations 52. Thus, the present invention functions completely independently of any application program running on the computer 10 that generates the displayed image 30. The annotations 52 associated with the glyphs 40 or marks 42 can be generated by the invented method prior to distributing the method of the present invention to end users, via a retail outlet for example.

Referring now to FIGS. 1–7 of the drawings, the preferred embodiment of the method of the present invention enables a number of different users User A, User B, User C, User D, and User E shown in a routing list 53, such as users in a threaded discussion for example, to review and annotate the primary image 36, using either glyphs 40, marks 42, or both. A first user A of the invented method generates the display image 30 they desire to capture by running any chosen application program on their computer 10A. The user A then invokes the method of the present invention into the computer's memory 24 for processing the method, which generates a menu 56 in a window 55 that presents the user with a number of different commands relating to capturing the displayed image 30 for generating the primary image 36 that are selectable using the mouse 18 or keyboard 16. The selectable commands preferably include, but are not limited to, capturing a specified window 57, capturing the entire display that can include multiple windows 58, or capturing a user-specified area of the display 59. A number of primary images 36 may be generated this way for transmitting the primary images 36 to a number of subsequent users B–E 53.

Figure 2:
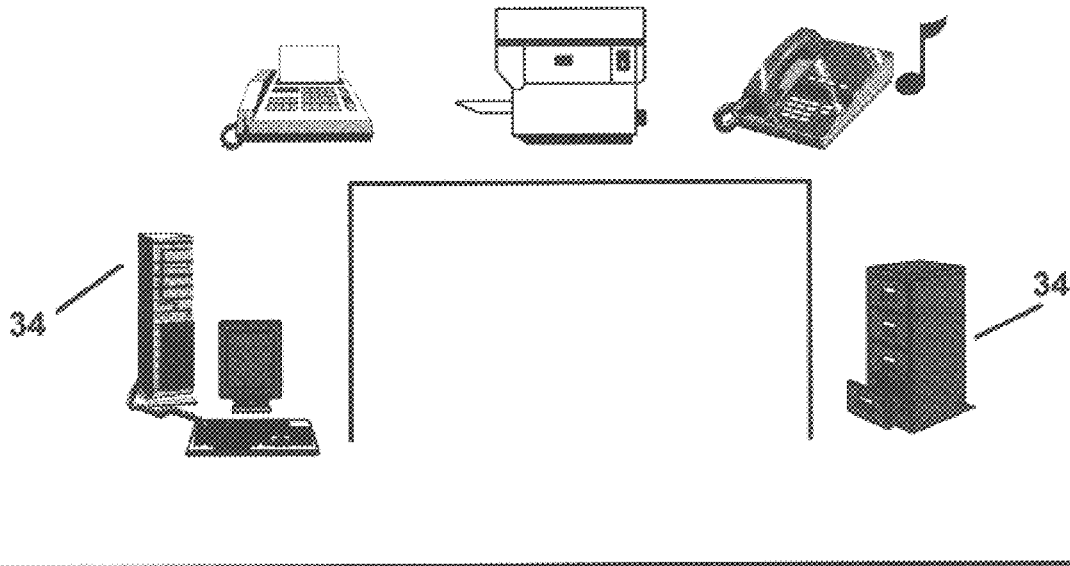
FIG. 2 is an illustration of an image generated by an application program displayed on a monitor of the computer while running the program.
Figure 3:
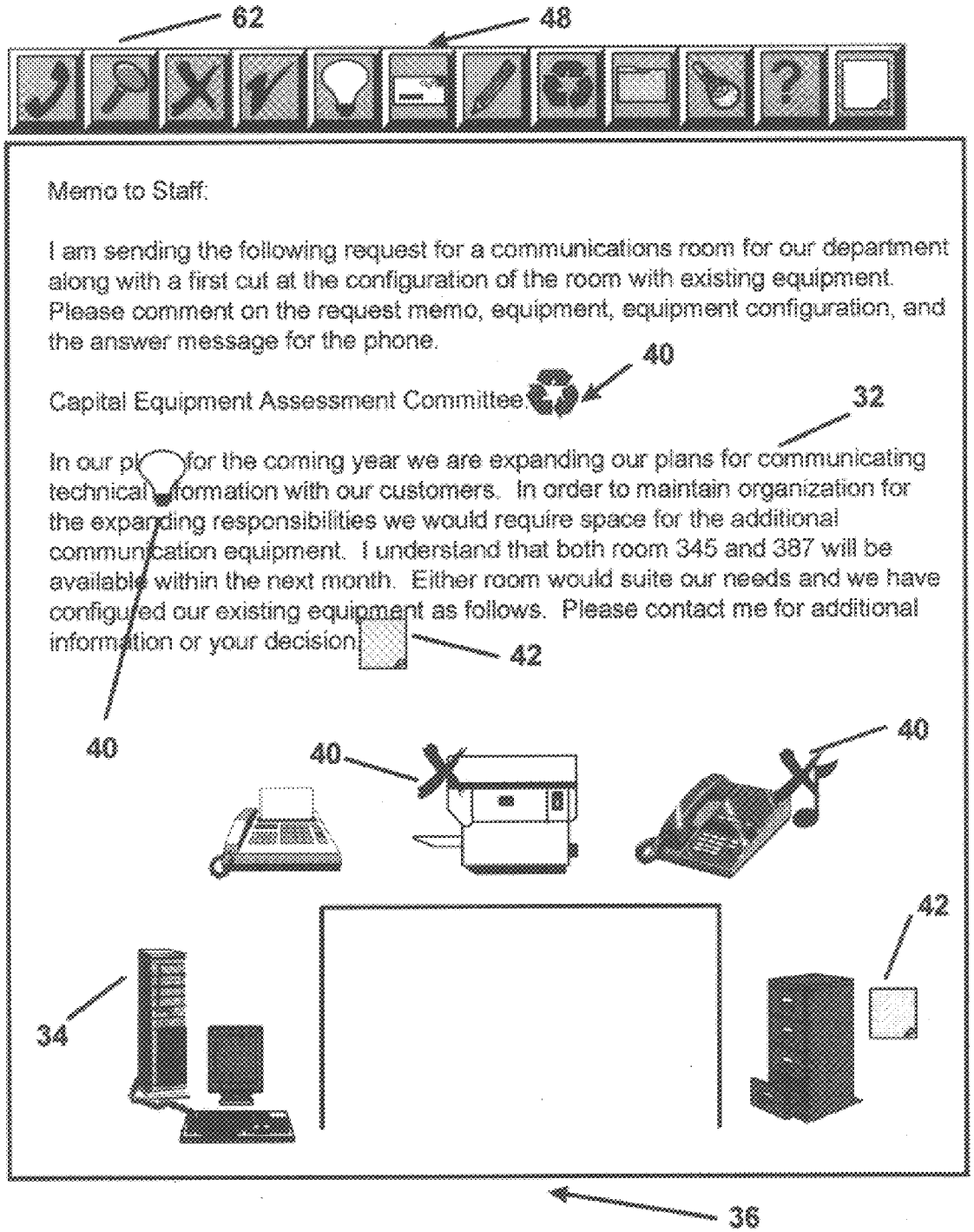
FIG. 3 is an illustration of a primary image generated by the method of the present invention indicating that annotations have been made thereto by glyphs and marks.
Figure 4:
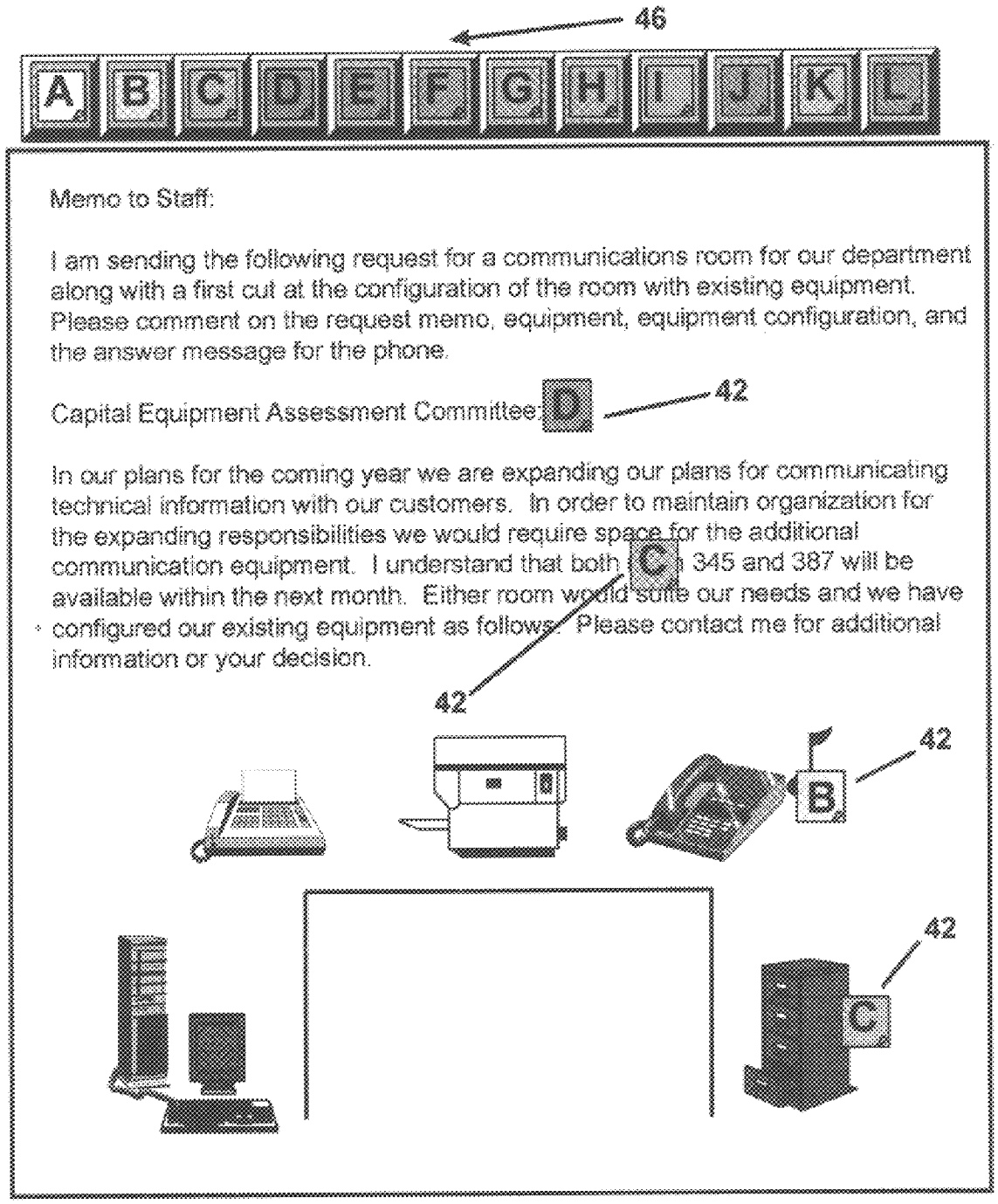
FIG. 4 is an illustration of a primary image generated by the method of the present invention indicating that annotations have been made thereto by marks.
Figure 5:
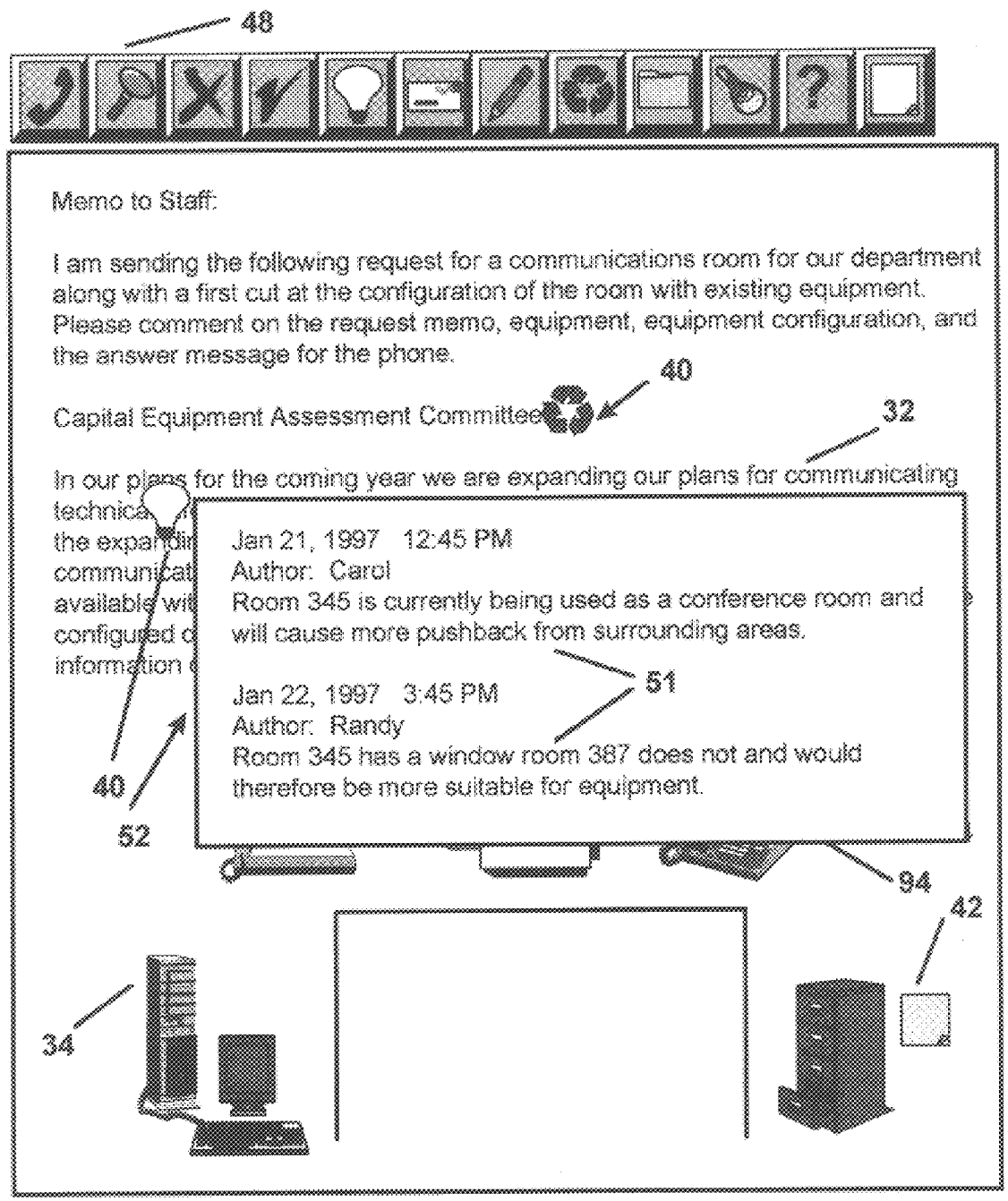
FIG. 5 is an illustration of the primary image showing the annotations made to the primary image.
Figure 6:
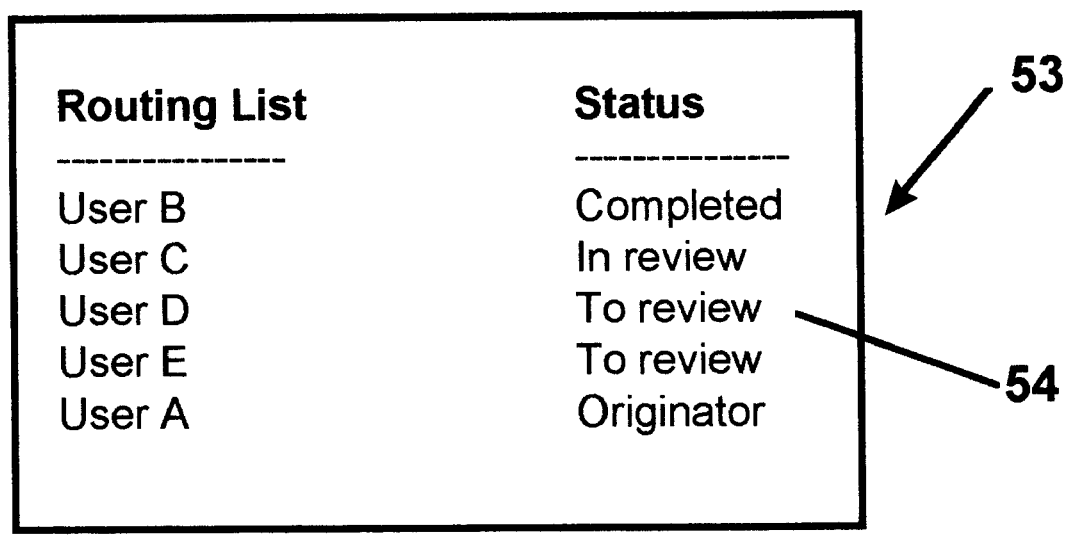
FIG. 6 is an illustration of a routing list for distributing the primary image to selected users for annotation thereby.
Figure 7:
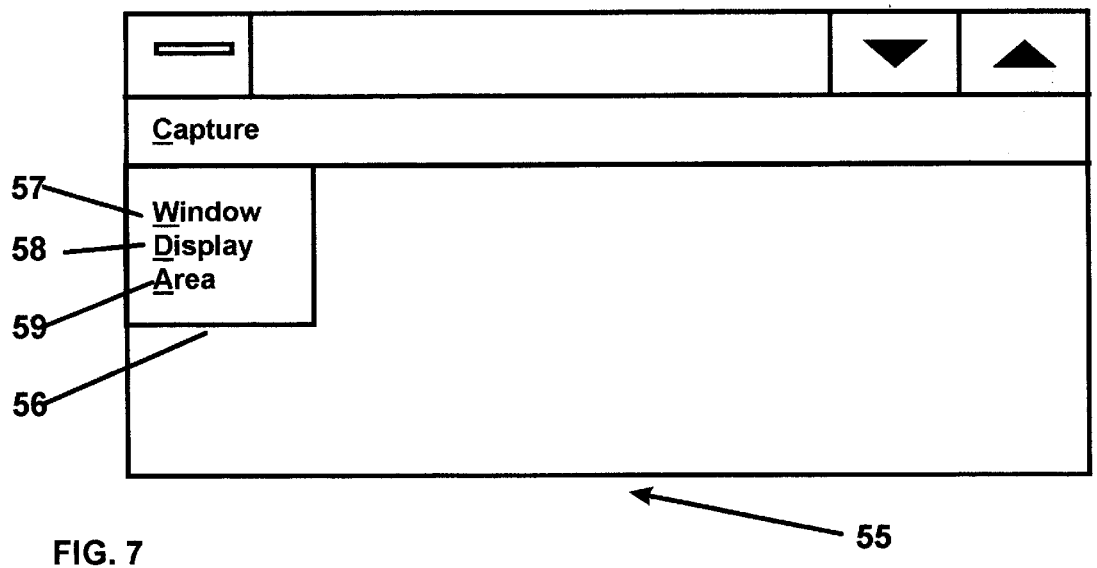
FIG. 7 is a diagram of the screen capture selection of the present invention.

The user A selects the desired command 57, 58, 59 to capture all or some desired portion of the image 30 on the screen 14A to generate the primary image 36. If it is desired by the user A to capture a specified window, the user A selects the specified window option 57 from the menu 56. The screen cursor (not shown) is altered to allow the user A to define a rectangular area on their screen 14A. The user A then draws a rectangular area on the screen 14A, in which the screen area within the boundary of the rectangle is captured and displayed in a separate window indicating the newly generated primary image 36, as shown in FIG. 2.

Once the user A has generated the primary image 36, they can then make any desired annotations 52 to the image 36, or they can elect to transmit the image 36 to selected remote locations on a computer network, as illustrated schematically by the second computer 10B. The routing list 53 is generated by the first user A for routing the primary image 36 secondary image, and annotations 52 that the first user may have included to subsequent users B–E. The primary image 36 can be routed to one or more subsequent users B-E indicated in the routing list 53, to enable the users B–E to annotate the primary image 36. The primary image 36 is transmitted to the subsequent users B–E with known and emerging computer communications tools including LANs and the Internet, for example.

Several different methods can be used for transmitting the primary image 36 to the users A–E on the routing list 53. One desired method for transmitting the primary image 36 would comprise parallel transmission, transmitting the image 36 simultaneously to each subsequent user B–E for example. When parallel routing is utilized, the primary image 36 or images, and its associated components including glyphs 40 and marks 42, annotations 52, and the routing list 53, are transmitted to each subsequent user B–E on the routing list 53 during one sending period. Each subsequent user B-E on the list 53, is marked with a comment 54, such as "In review", adjacent to their name. Once reviewed, the user B–E is marked with a "completed" comment 54 on the list 53, and the reviewed image or images 36, glyphs 40 and marks 42, and annotations 52 are transmitted back to the sender user A, the last name on the routing list 53.

Each subsequent user B–E, upon receipt of the primary image 36 (only one image 36 is discussed for clarity) and the associated components transmitted therewith, is able to view glyphs 40 and marks 42 selectively, and the annotations 52 of selected glyphs 40 and marks 42. Additionally, the sorted annotations 52 of selected glyphs 40 or marks 42 are available for viewing by the user B–E, if there is appended information to the annotation 52.

Another preferable method for transmitting the primary image 36 to subsequent users B–E comprises transmitting the primary image 36 to each subsequent user B–E sequentially. Using sequential transmission, the first user A transmits the primary image 36 and each of its associated components, including the routing list 53, to the first subsequent user B, so that they can review the image 36 and input their annotations 52 using the glyphs 40 and marks 42, or append to existing annotations 52 made by the first user A. During their review, the user B, and likewise for each user on the list 53, is marked with an "in review" comment 54, and upon completion there is a "completed" comment 54 placed adjacent to their name. After review by the subsequent user B, the annotated primary image 36 is transmitted to the next subsequent user C for their review and annotation input. The string of subsequent users continues in a threaded discussion type communication format, until the repeatedly annotated primary image 36 reaches the last one of the subsequent users, which is the first user A. The first user A can then act on the annotated primary image 36. Additionally, the discussed methods of image transmission can be combined in any suitable combination desired by the users A–E, so long as each desired user can review the primary image 36 and add their annotations 52 thereto.

Figure 8:
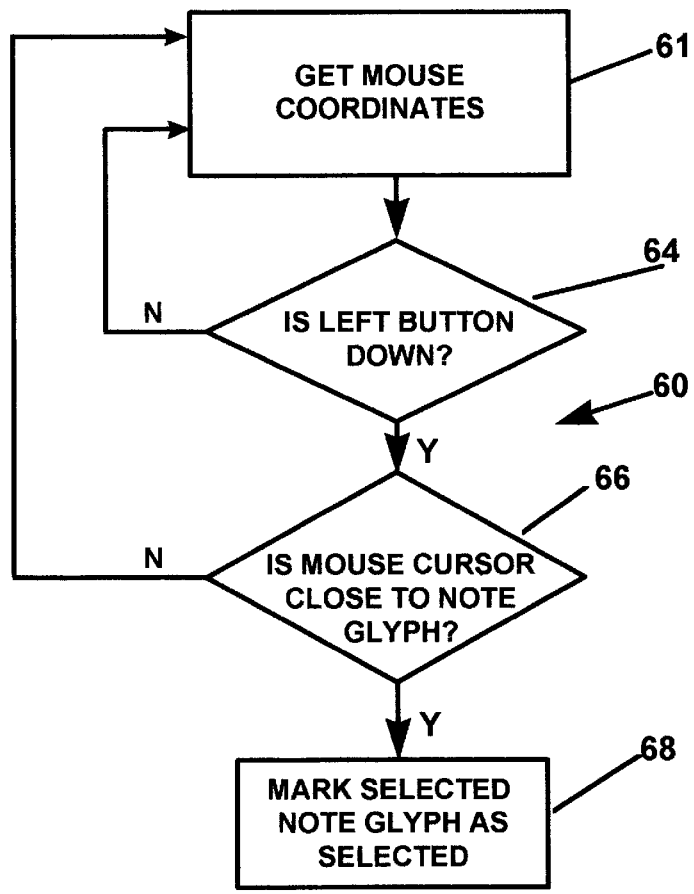
FIG. 8 is a flow diagram of an annotation select module of the method of the present invention.

Referring now to the drawings, and particularly to FIG. 8, a particular glyph 40 or mark 42 is selected by invoking a select annotation processing module 60 of the invented method. The module 60 is invoked by positioning a pointer of the mouse 18, and determining the coordinates of the mouse 18 as shown in process block 61, shown on the monitor's screen 14, indicating the desired glyph 40 or mark 42. The mouse 18 is then activated by pressing a button on the mouse 18, as shown in decision block 64, to select the glyph 40 or mark 42.

Figure 9:
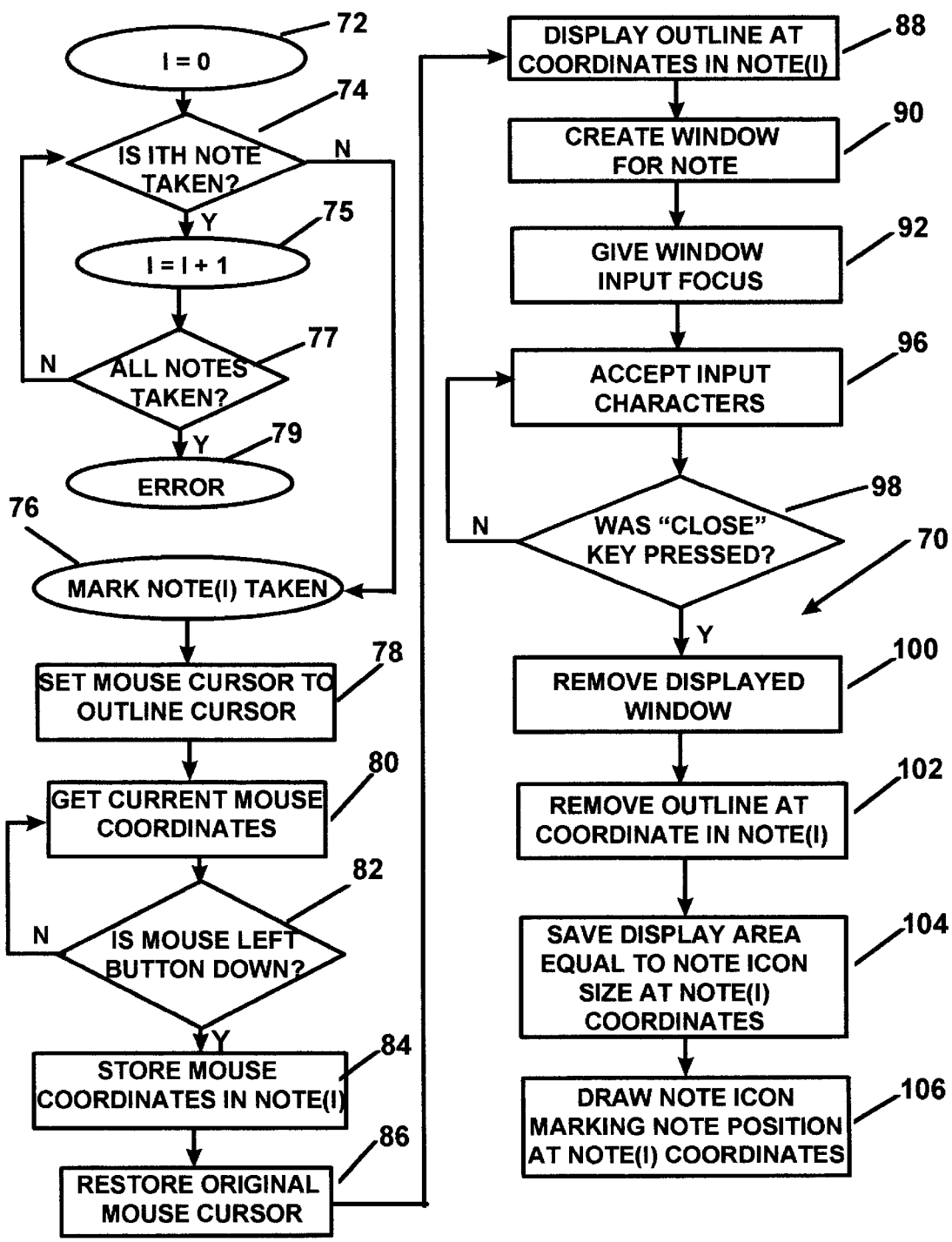
FIG. 9 is a flow diagram of an annotation add module of the invented method.

As shown in FIG. 9, once a glyph 40 or mark 42 is opened and positioned on the primary image 36, the glyph 40 or mark 42 provides for annotations 52 to be associated therewith. If it is desired to add an annotation 52 to the glyph 40, for example, then an add an annotation module, shown generally at 70, of the present invention is invoked at start block 72. In decision block 74 it is determined if an annotation, and additionally a final annotation 52, has been taken. If the final annotation 52 was not taken, a counter 75 is incremented. In decision block 77 it is determined if all annotations 52 have been taken. If all annotations 52 have not been taken, the module 70 returns to decision block 74. If all annotations have been taken then the module 70 terminates in end block 79.

In decision block 74 if it is determined that the final annotation 52 was not taken, the module 70 continues to start block 76, for initializing the reception of an annotation 52. In process block 78 the mouse pointer is altered to a "outline" configuration for determining a suitable position on the image 36. Once the configuration of the pointer is altered, the coordinates of the mouse 18 are determined in process block 80. Once the coordinates of the mouse 18 are determined, in decision block 82 it is determined if the mouse button is depressed for activating the mouse 18. If the mouse button is not depressed then the module returns to process block 80 for again obtaining the coordinates of the mouse 18. If the mouse 18 is activated, then the module continues to process block 84 for storing the coordinates of the mouse 18 and to process block 86 where the mouse cursor is returned to its initial form.

The module 70 continues to process block 88, wherein the glyph 40 is displayed at the position on the primary image 36 indicated by the mouse coordinates. In process blocks 90 and 92 a window 94 (shown in FIG. 5) for receiving an annotation 52 is created. After the window 94 is created, then at process block 96 the user can then input the annotation 52, which may comprise desired data or information including, textual notes 51, graphics, or audio data which is commentary or an explanation that preferably pertains to the primary image 36. A like module is used to append to existing annotations 52. The module 70, preferably adds the date, a time stamp, author, and similar information to the annotation 52, to enable the annotations 52 to be sorted and ordered by criteria including date, author, and time for instance.

After the data comprising the annotation 52 is input into the window 94, the module continues to decision block 98 to determine if the user has completed data input. If the user has not completed data input, the module returns to process block 96 for further data input. If it is determined that the user has completed data input, then at process block 100 the window 94 is removed from the display of the primary image 36. The module 70 continues through process blocks 102, 104, and 106, wherein the position of the glyph 40 is noted and retained for accessing the glyph 40 by subsequent users.

Referring to the flow diagram of FIG. 10, if it is determined that the user wants to read an annotation 52, then a read module 110 is invoked by the present invention. In process block 112 a window 94 is created adjacent to a marked glyph 40 or mark 42 and opened in process block 114. The glyph 40 or mark 42 can be marked in a plurality of different ways. The positions of glyphs 40 and marks 42 on the image 36 is indicated by the shape of the glyph 40 or mark 42, form thereof, color, and animation. Such animation may include glyphs 40 or marks 42 blinking, or rotating about, to aid with determining the position of the glyph 40 or mark 42.

After the window 94 is created in process block 114, the module continues to process block 116 that provided viewing of the annotation 52 saved in the window 94. The module 110 continuously monitors, in process block 118 for the activation of closing the window 94, such as pressing the button on the mouse 18. Once the close activation signal is received, the display window 94 is removed in process block 120 and the noting of the selected glyph 40 or mark 42 is removed.

FIG. 11 shows a diagram of a module 124 for deleting an annotation 52. The delete module 124 comprises process block 126, wherein a display area containing an annotation 52 is restored, thus removing the annotation 52. The module 124 terminates in end block 128, wherein the area is now indicated as free of an annotation 52, thus removing the annotation 52.

Figure 12:
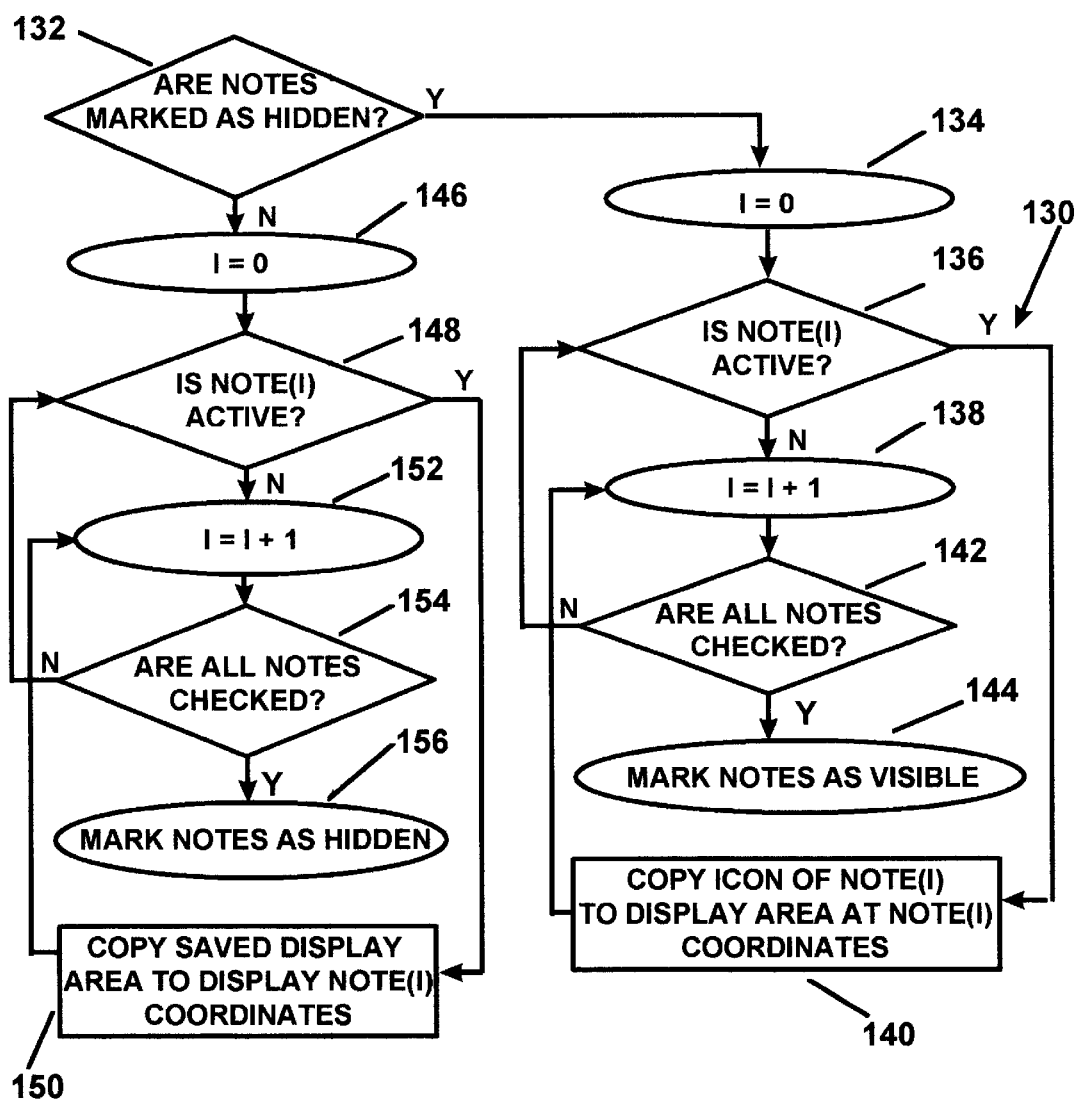
FIG. 12 is a flow diagram of an annotation hide module of the invented method.

Referring now to FIG. 12 of the drawings, there is shown a flow diagram 130 for determining and selectively hiding and exposing the glyphs 40 and marks 42, so that they may be either viewed or hidden from view so that they will not interfere with viewing the primary image 36 for example. The module 130 begins at decision block 132 wherein it is determined if and what glyphs 40 and marks 42 are marked as hidden. If the glyphs 40 and marks 42 are marked as hidden, then the module 130 continues to start block 134 to initialize a counter and invoke a procedure for exposing the glyphs 40 and marks 42. In decision block 136 it is determined if a selected glyph 40 or mark 42 is activated. If the glyph 40 or mark 42 is activated, the module 130 continues to process block 140, wherein the coordinates of the glyph 40 or mark 42 are noted for exposing the glyph 40 or mark 42 and incrementing a counter 138.

Returning to decision block 136, if it is determined that the glyph 40 or mark 42 is not active, then the counter 138 is incremented and the process continues to decision block 142 for determining if all glyphs 40 and marks 42 have been checked. If all glyphs 40 and marks 42 have been checked, then the process 130 terminates in end block 144, and indicates that all selected glyphs 40 and marks 42 are visible. If, in decision block 142, that it is determined that all glyphs 40 and marks 42 have not been checked, then the process 130 returns to decision block 136, and proceeds therefrom as discussed.

Returning to decision block 132, if it is determined that all blocks are not marked as hidden, then the process 130 continues to start block 146 to invoke a procedure and initialize a counter for hiding the glyphs 40 and marks 42. In decision block 148 it is determined if a selected glyph 40 or mark 42 is activated. If the glyph 40 or mark 42 is activated, the process continues to process block 150, wherein the coordinates of the glyph 40 or mark 42 are noted for hiding the glyph 40 or mark 42 and incrementing a counter 152.

Returning to decision block 148, if it is determined that the glyph 40 or mark 42 is not active, then the counter 152 is incremented and the process continues to decision block 154 for determining if all glyphs 40 and marks 42 have been checked. If all glyphs 40 and marks 42 have been checked, then the process 130 terminates in end block 156, and indicates that all selected glyphs 40 and marks 42 are hidden. If, in decision block 154, it is determined that all glyphs 40 and marks 42 have not been checked, then the process 130 returns to decision block 148, and proceeds therefrom as discussed.

Figure 13:
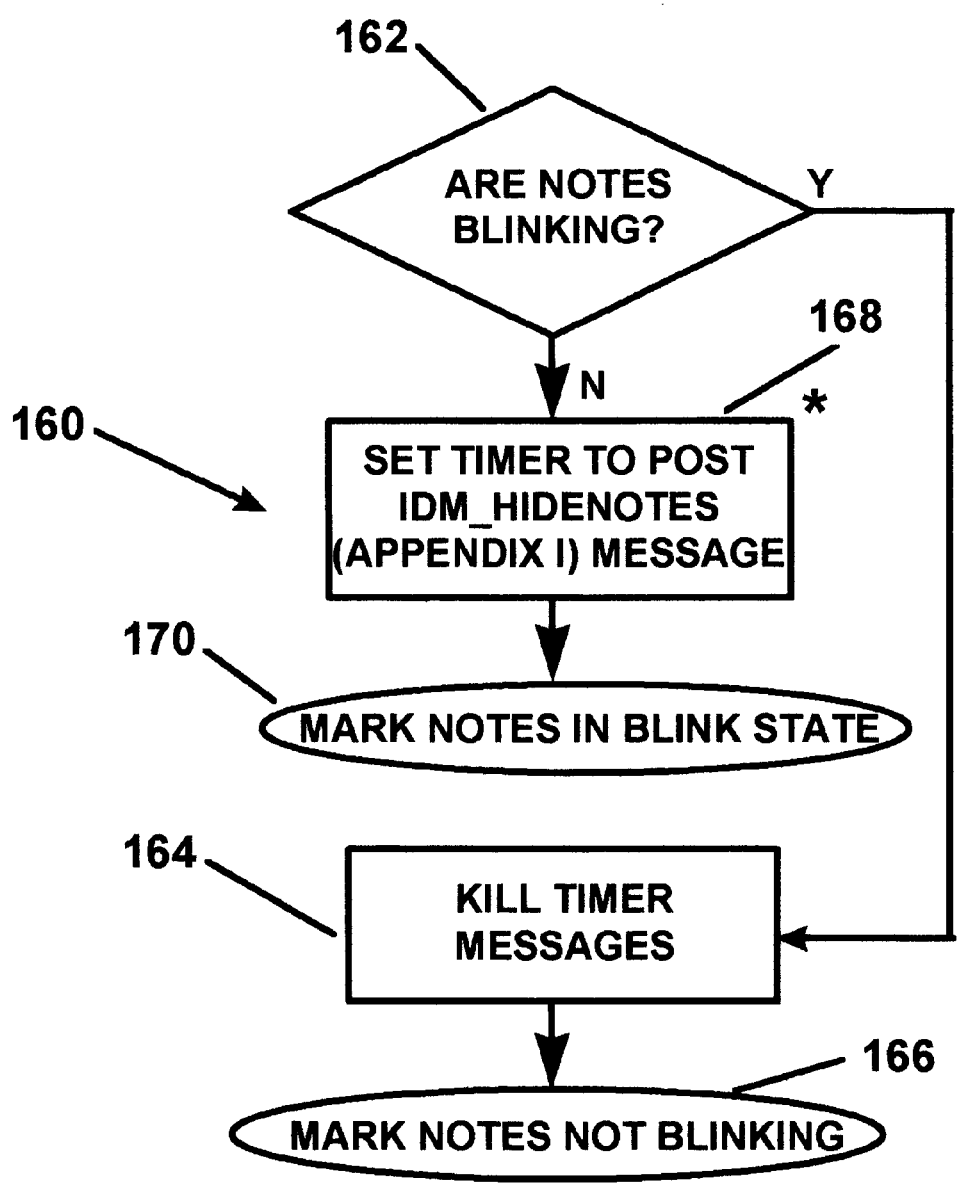
FIG. 13 is a flow diagram of an annotation blink module of the invented method.

FIG. 13 is a flow diagram of a blink annotation module 160 of the method of the present invention, to induce animation of the glyphs 40 and marks 42 such as blinking, for example. For clarity, the discussion regarding the blink module 160 is directed to marks 42, yet it is to be understood that glyphs 40 may be similarly controlled. The module 160 begins at decision block 162 wherein it is determined if marks 42 are blinking. If marks 42 are blinking, then the module 160 continues to process block 164 and terminates any timer messages 164. Thereafter, module 160 terminates at end block 166 and the blinking of the marks 42 is terminated.

If it is determined at decision block 162 that the marks 42 are not blinking, then a timer is initialized in process block 168 and the module 160 terminates in end block 170, wherein the marks 42 are set in blinking state for the duration of a count down time period controlled by the timer activated in process block 168.

Figure 14:
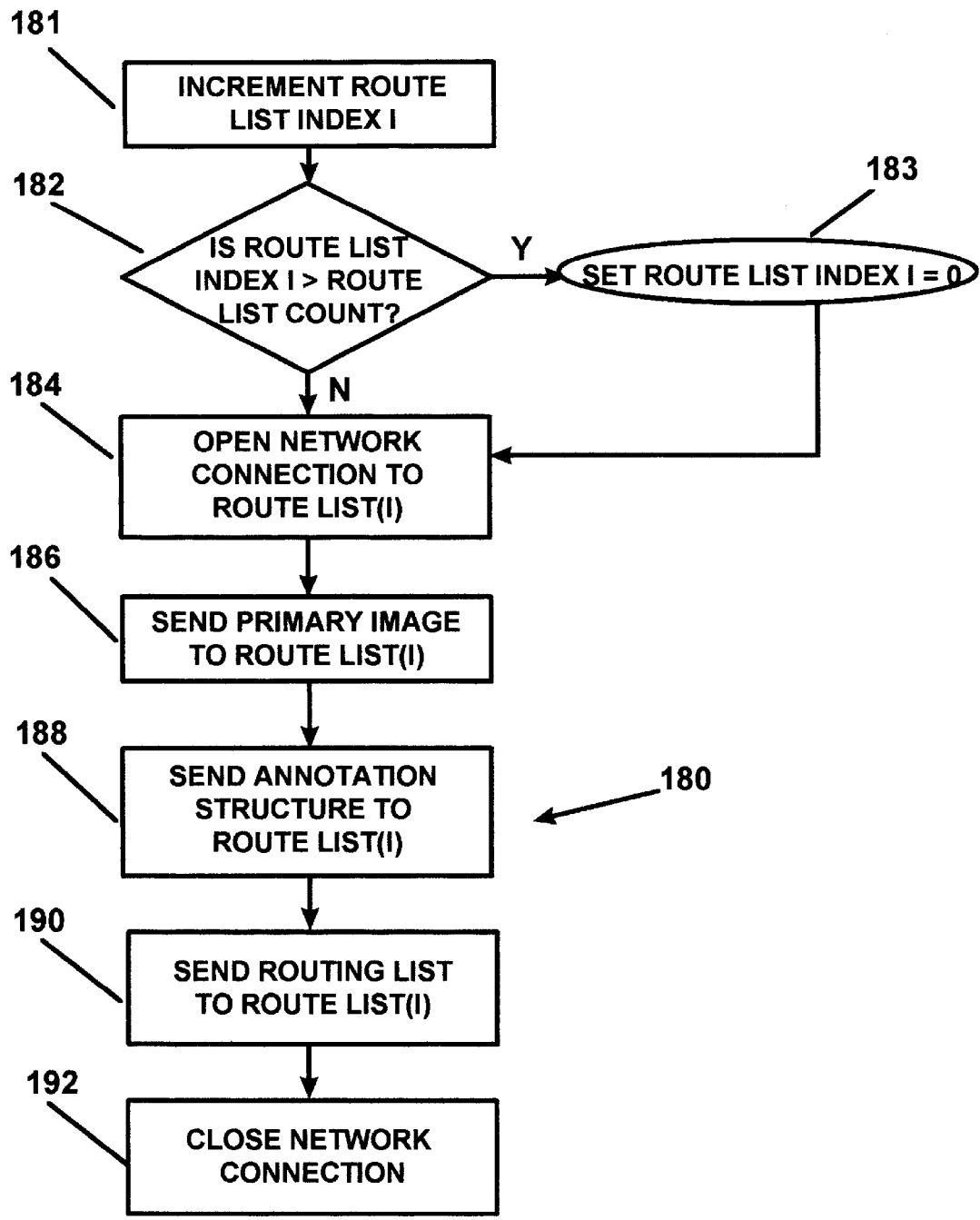
FIG. 14 is a flow diagram of a serial routing module of the invented method.

Referring to FIG. 14 of the drawings, there is shown a flow diagram of a serial routing module 180 of the method of the present invention. The serial routing module 180 facilitates serial routing of the primary image 36 and its associated annotation set to a set of specified users B–E connected via the computer network 26. In process block 181 an index associated with the routing list 53 is incremented. In decision block 182, the index is checked against a count of total entries of the routing list 53. If the index is found to exceed the value of the count, process block 183 resets the route list 53 index to zero, and flow continues to process block 184. In this particular implementation, the zero entry of a route list 53 is reserved for the route list originator.

If the index is found not to exceed the value of the count, flow continues directly to process block 184. Process block 184 opens a network connection 26 to the route list 53 entry specified by the index. Once the network 26 connection has been successfully completed, process block 186 initiates a network transmission of the primary image 36 including any superimposed glyphs 40 or marks 42, or both. Process block 188 initiates a network transmission of the annotation structure that includes the text annotations 51 associated with each glyph 40 and mark 42, in addition to any associated audio stream, animation sequence, or other information as previously discussed. Process block 190 initiates a network transmission of the routing list 53, which facilitates the subsequent routing of the primary image 36, its annotation set structure, and routing list 53 to any remaining recipients. Process block 192 closes the network 26 connection used to facilitate the routing transmission.

Figure 15:
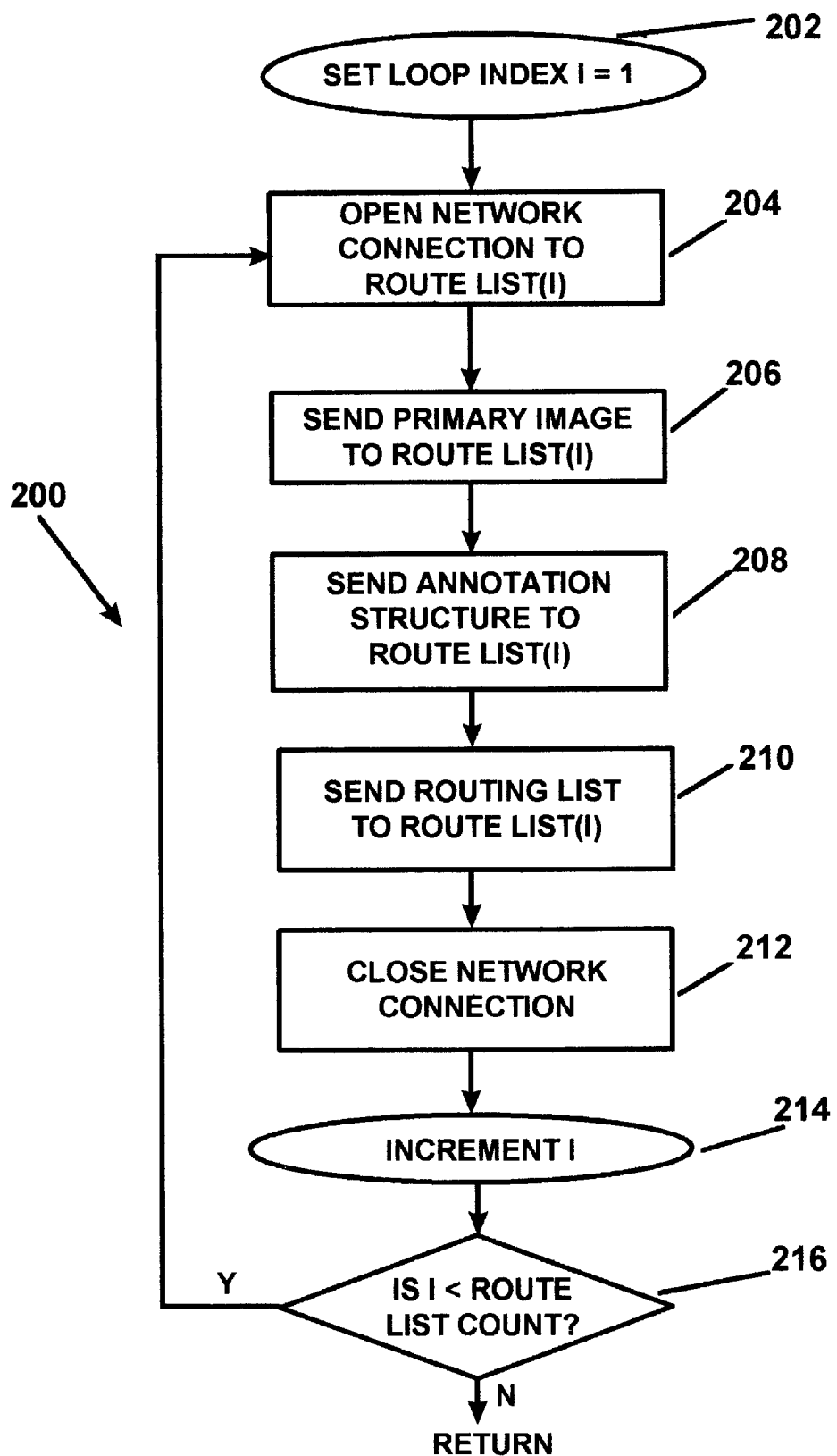
FIG. 15 is a flow diagram of a parallel routing module of the preferred embodiment of the method of the present invention.

FIG. 15 of the drawings shows a parallel routing module 200 of the method of the present invention, provided to facilitate parallel routing of the primary image 36 and its associated annotation set to a set of specified users B–E connected via the computer network 26. In process block 202 a loop counter is initialized to the value 1. Process block 204 opens a network connection 26 to the route list 53 entry specified by the loop counter. Once the network 26 connection has been successfully completed, process block 206 initiates a network transmission of the primary image 36 including any superimposed glyphs 40 or marks 42, or both.

Process block 208 initiates a network transmission of the annotation structure that includes text 52 in the annotation 52 associated with each glyph 40 or mark 42, in addition to any associated audio stream, animation sequence, or other information. Process block 210 initiates a network transmission of the routing list 53. In this implementation the copy of route list 53 is transmitted as an option to allow all recipients an opportunity to discover all listed recipients named in routing list 53. Process block 212 closes the network 26 connection used to facilitate the routing transmission.

Process block 214 of routing module 200 increments the loop counter. Decision block 216 compares the loop counter to a count kept with routing list 53. If the loop counter is found to be less than the route list 53 count, flow is returned to process block 204 for further processing by the routing module 200. If the loop counter is found to not be less than the route list 53 count in decision block 216, flow leaves parallel routing module 200.

Thus, there has been described a method of superimposing secondary, graphical images, referred to as glyphs and marks, on a primary image for annotating the primary image. The glyphs and marks are opened to access annotations attached thereto. The annotations communicate information pertaining to the primary image. Annotations can be sorted and ordered by criteria including date and author. Position, shape, form, color, and animation provide information about glyphs and marks. Glyphs and marks are opened by users for adding their own annotations to the primary image. The marks and glyphs can either all be displayed or hidden, selectively displayed or hidden, along with their annotations. Hiding eliminates undesired interference when viewing the primary image. The glyphs and marks can be animated, such as by blinking or rotating, in order to distinguish them from the primary image. The invention enables users to either sequentially, or in parallel, review and annotate the primary image.

Appendix I is provided to faciliate an understanding of the preferred embodiment of the present invention, and particularly for programming the invented method.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

APPENDIX I

The following program source code is provided merely as an example of the preferred embodiment of the method of the prsent invention. The example program source code is derived from an actual running application that uses the annotation method described herein. The this particular implementation, the annotations 52 are referred to as notes. The implementation that follows is coded in the C programming language using the Microsoft Windows Application Programming Interface, by Mcrosoft Corporation, Redmond, Washington, to implement an annotation system for a graphical user interface windowing environment, for example.

The following section of source code represents code typically found in the Microsoft Windows window procedure.

Select which Windows message has been sent...

switch(message) {

. . .

WM_LBUTTONDOWN (FIGURE 8) is a standard Microsoft Windows window procedure message that denotes that the user has depressed the left mouse button. In this implementation, the pressing of the left mouse button begins the process of selecting a particular mark/glyph from a set of working annotations. In the implementation below, we check if the note set is hidden or visible. If the note(s) (marks/glyphs) are visible on the display, notefind() is called to compare the mouse hotspot coordinates with each of the notes in the current working annotation set. If the mouse cursor is found to be within some small neighborhood of a note icon, that note icon is "marked" on the display as the "selected" note. A selected note can then be opened to read its contents (text, graphic, audio, ...) or deleted from the working set.

```
        case WM_LBUTTONDOWN:
            if(notehide == MF_UNCHECKED) {
                i = notefind(MAKEPOINT(lParam));
                if(i != -1)
                    if(noteslct != i) {
                        if(noteslct != -1) selectbox(noteslct,hwnd);
                        selectbox(noteslct=i,hwnd);

EnableMenuItem(hMenu1,IDM_DELNOTE,MF_ENABLED);
```

```
            EnableMenuItem(hMenu1,IDM_READNOTE,MF_ENABLED);
                            return 0;
                    }
5           }
            break;

IDM_ADDNOTE (FIGURE 9) is the case that adds a new annotation to the set of working
       annotations (notes). We check if a note pool has been allocated and, if not, attempt to do so.
10     With an allocated note pool, we then allocate a single note via a call to noteget(). notemark()
       then switches the mouse cursor to a small square allowing the user to position the new note on
       the display at the precise location desired. Once the position has been set, the coordinates of the
       new note are recorded in note[i].x,y and a new window created and displayed to receive input to
       be recorded as the new annotation. In this sample implementation, when the user has completed
15     inputting characters that form the remarks of the associated annotation, the Esc key is pressed
       that removes the displayed note window from view and places a small glyph bitmap (putarea())
       at the position selected with notemark() to record where on the general display area the new
       annotation applies.
            case IDM_ADDNOTE:
20              {POINT p;
                if(!note)
                        if(notemem() == -1) {
                                DialogProc =
MakeProcInstance((FARPROC)GenericDlg,hInstance);
25                              DialogBox(hInstance,"NoteMemDlg",hwnd,DialogProc);
                                FreeProcInstance(DialogProc);
                                break;
                        }
                i = noteget();
30              if(i == -1) {
                        DialogProc = MakeProcInstance((FARPROC)GenericDlg,hInstance);
                        DialogBox(hInstance,"NoteOutDlg",hwnd,DialogProc);
                        FreeProcInstance(DialogProc);
                        break;
35              }
                p = notemark(hwnd,hAddNoteC,0);
                note[i].x = p.x, note[i].y = p.y, note[i].t = notecolor;
                selectbox(i,hwnd);
                chgd = ShowNote(i,1);
40              selectbox(i,hwnd);
                if(chgd) {
                        HBITMAP hb;
                        GetObject(noteGlyph,sizeof(BITMAP),(LPSTR)&bm);
                        hdc = GetDC(hwnd);
``` crm-9701.app

-22-

```
            hb = CreateCompatibleBitmap(hdc,bm.bmWidth,bm.bmHeight);
            getarea(hdc,hb,note[i].x,note[i].y,SRCCOPY);
            GetBitmapBits(hb,(DWORD)BSZ,(LPSTR)note[i].b);
            putarea(hdc,noteGlyph,note[i].x,note[i].y,SRCCOPY);
            DeleteObject(hb);
            ReleaseDC(hwnd,hdc),hdc=0;
            EnableMenuItem(hMenu1,IDM_ADJUST,MF_ENABLED);
            EnableMenuItem(hMenu1,IDM_HIDENOTES,MF_ENABLED);
            EnableMenuItem(hMenu1,IDM_BLINKNOTES,MF_ENABLED);

CheckMenuItem(hMenu1,IDM_HIDENOTES,notehide=MF_UNCHECKED);
            ++notecnt;
        } else
            noteput(i);
            break;
    }
```

IDM_DELNOTE (FIGURE 11) is the case that deletes a note from a set of working annotations (notes). Deleting a note essentially is comprised of two actions; 1) replace the glyph bitmap (putarea()) on the display that marks the position of the note selected for deletion with the previously saved display area that was replaced by the glyph and, 2) mark the deleted note as available for reuse (noteput()).

```
        case IDM_DELNOTE:
            {POINT p;
            HBITMAP hb;
            GetObject(hNoteY,sizeof(BITMAP),(LPSTR)&bm);
            hb = CreateCompatibleBitmap(hdc=GetDC(hwnd),bm.bmWidth,bm.bmHeight);
            SetBitmapBits(hb,(DWORD)BSZ,(LPSTR)note[noteslct].b);
            putarea(hdc,hb,note[noteslct].x,note[noteslct].y,SRCCOPY);
            DeleteObject(hb);
            ReleaseDC(hwnd,hdc),hdc=0;
            selectbox(noteslct,hwnd);
            noteput(noteslct);
        noteslct = -1;
            EnableMenuItem(hMenu1,IDM_DELNOTE,MF_GRAYED);
            EnableMenuItem(hMenu1,IDM_READNOTE,MF_GRAYED);
            --notecnt;
            if(notecnt == 0) {
                EnableMenuItem(hMenu1,IDM_ADJUST,MF_GRAYED);
                EnableMenuItem(hMenu1,IDM_HIDENOTES,MF_GRAYED);
                EnableMenuItem(hMenu1,IDM_BLINKNOTES,MF_ENABLED);

CheckMenuItem(hMenu1,IDM_HIDENOTES,notehide=MF_UNCHECKED);
            }
```

```
                break;
            }
```

IDM_READNOTE is the case that displays a note selected from a set of working annotations
(notes). 'noteslct' is the variable that indicates which note (mark/glyph) was selected for
viewing. ShowNote() is the procedure that displays a selected note.

```
            case IDM_READNOTE:
                (void) ShowNote(noteslct,0);
                selectbox(noteslct,hwnd);
        noteslct = -1;
                EnableMenuItem(hMenu1,IDM_DELNOTE,MF_GRAYED);
                EnableMenuItem(hMenu1,IDM_READNOTE,MF_GRAYED);
                break;
```

IDM_HIDENOTES (FIGURE 12) is the case that allows for the active note set to have its'
glyphs hidden from the image they are superimposed upon. This allows a complex image to be
viewed without possibly many note glyphs interfering with the image. Of course, this case
allows for the note glyphs to be unhidden so their contents may be read.

```
            case IDM_HIDENOTES:
                if(notehide == MF_UNCHECKED) {
                    HBITMAP hb;
                    hdc = GetDC(hwnd);
                    GetObject(hNoteY,sizeof(BITMAP),(LPSTR)&bm);
                    hb = CreateCompatibleBitmap(hdc,bm.bmWidth,bm.bmHeight);
                    for(i=0; i<notemax; ++i)
                        if(note[i].x != -1) {
                            SetBitmapBits(hb,(DWORD)BSZ,(LPSTR)note[i].b);
                            putarea(hdc,hb,note[i].x,note[i].y,SRCCOPY);
                        }
                    DeleteObject(hb);
                    ReleaseDC(hwnd,hdc),hdc=0;
                    if(noteslct != -1) {selectbox(noteslct,hwnd);noteslct = -1;}
                    notehide = MF_CHECKED;
                } else {
                    hdc = GetDC(hwnd);
                    for(i=0; i<notemax; ++i)
                        if(note[i].x != -1) {
                            if(note[i].t == 1)
                                putarea(hdc,hNoteY,note[i].x,note[i].y,SRCCOPY);
                            if(note[i].t == 2)
                                putarea(hdc,hNoteR,note[i].x,note[i].y,SRCCOPY);
                            if(note[i].t == 3)
                                putarea(hdc,hNoteB,note[i].x,note[i].y,SRCCOPY);
```

```
                                    if(note[i].t == 4)
             putarea(hdc,hNoteG,note[i].x,note[i].y,SRCCOPY);
                            }
                            ReleaseDC(hwnd,hdc),hdc=0;
 5                          notehide = MF_UNCHECKED;
                    }
                    CheckMenuItem(hMenu1,IDM_HIDENOTES,notehide);
                    break;

10       IDM_BLINKNOTES (FIGURE 13) is the case that allows the active note glyphs to blink on
         and off, allowing the note glyphs to be found when superimposed in what may be a complex
         image. Note in this implementation that the blinking of the note glyphs is done by leveraging off
         the fact that IDM_HIDENOTES is written to toggle from the hidden state to the unhidden state.
         This implementation uses the Microsoft Windows timer feature to post IDM_HIDENOTES
15       messages to toggle the set of note glyphs on and off.
                    case IDM_BLINKNOTES:
                    {static uchar blink=0;
                            if(blink=1-blink) {
                                    CheckMenuItem(hMenu1,IDM_BLINKNOTES,MF_CHECKED);
20                                  SetTimer(hwnd,1,500,0);
                            } else {
                                    CheckMenuItem(hMenu1,IDM_BLINKNOTES,MF_UNCHECKED);
                                    KillTimer(hwnd,1);
                                    notehide = MF_CHECKED;
25                                  PostMessage(hwnd, WM_COMMAND, IDM_HIDENOTES, 0L);
                            }
                    }
                    break;
                    . . .
30       }
```

The following section of source code would represent code in a separate procedure, called from
the source code in the prior section.

35   Declare the mathematical functions of 'minimum' and 'maximum'.
     #define min(a,b) (((a) < (b)) ? (a) : (b))
     #define max(a,b) (((a) > (b)) ? (a) : (b))

'BUFFER(x,y)' is a function whose value is the character found at the coordinate
40   of x and y within the displayed annotation.
     #define BUFFER(x,y) *(note[k].n + y * cxBuffer + x)

The annotations are given an default color and font.
     #define NOTECOLOR RGB(250,250,0)

```
#define NOTEFONT SYSTEM_FIXED_FONT
#define HS_CREATE -9

A structured list is used to describe the set of annotations.
5    struct note _far *note;

Keep track of the maximum number of notes allowed, a count of notes in active use.
     UINT notemax,notecnt=0;
     int noteslct=-1;
10   static int k,newnote;
     extern HCURSOR hDelHitC;

'ShowNote' (FIGURE 10) is called to display either a new note or an already existing note.
     This function is essentially needed only due to Microsoft Windows. Its purpose is to physically
15   get a specified note rendered on a display screen. A particular note is specified by the passed
     parameter 'i'. 'i' specifies the ith note within the array of notes. The parameter 'n' is a boolean;
     it should beset to a non-zero value if this function is being called on behalf of a new note. It
     should be zero if the function ShowNote is being called on behalf of an existing note.
     int ShowNote(int i, int n)
20   {
     long FAR PASCAL _export NoteProc(HWND,UINT,UINT,LONG);
     MSG msg ;
     extern HWND hNote,hwnd;

25           k = i, newnote = n;
             SendMessage (hNote, HS_CREATE, hwnd, 0L) ;
             ShowWindow (hNote, SW_SHOW) ;
             UpdateWindow (hNote) ;
             while (GetMessage (&msg, hNote, 0, 0))
30                  {
                    TranslateMessage (&msg) ;
                    DispatchMessage (&msg) ;
                    }
             ShowWindow (hNote, SW_HIDE) ;
35           return msg.wParam ;
     }

'NoteProc' is called by the Microsoft Windows system whenever any input action occurs
     within the displayed note. Any data entry or mouse movements/actions are handled by
40   this function. The parameters passed are the standard parameters supplied for a Microsoft
     Windows window procedure.
     long FAR PASCAL _export NoteProc (HWND hwnd, UINT message, UINT wParam, LONG
     lParam)
     {
```

```
      static int cxChar, cyChar,cxClient, cyClient,cxBuffer, cyBuffer,xCaret, yCaret ;
      static HBRUSH brush;
      HDC   hdc ;
      int   x, y, i ;
 5    PAINTSTRUCT ps ;
      POINT p;
      TEXTMETRIC tm ;

switch (message) {
10   HS_CREATE is invoked on a one-time basis just before a note is to be rendered.
     Various values are computed that will be needed for subsequent manipulations of
     the rendered note.
              case HS_CREATE:
                  hdc = GetDC (hwnd) ;
15                SelectObject (hdc, GetStockObject (NOTEFONT)) ;
                  GetTextMetrics (hdc, &tm) ;
                  ReleaseDC (hwnd, hdc) ;
                  cxChar = tm.tmAveCharWidth ;
                  cyChar = tm.tmHeight ;
20                cxClient = NOTEC * cxChar;
                  cyClient = NOTER * cyChar;
                  cxBuffer = NOTEC;
                  cyBuffer = NOTER;
                  xCaret = yCaret = 0 ;
25                p.x = note[k].x + 20;
                  p.y = note[k].y - 10;
                  ClientToScreen(wParam,&p);

SetWindowPos(hwnd,HWND_TOP,p.x,p.y,cxClient+2,cyClient+cyChar+2,SWP_SHO
30   WWINDOW);
                  brush =
     SetClassWord(hwnd,GCW_HBRBACKGROUND,CreateSolidBrush(NOTECOLOR));
                  SetCaretPos (0, 0) ;
                  if(newnote)
35                    for(i = 0; i < (NOTEC * NOTER); ++i) note[k].n[i] = ' ';
                  return 0 ;

WM_SETFOCUS sets the displayed note as the window on the screen that is to receive all
     keyboard and mouse-movement input. A text-insertion mark, or caret, is displayed when the
40   mouse cursor is moved to within the rectangular dimensions of the displayed note.
              case WM_SETFOCUS:
                  CreateCaret (hwnd, NULL, cxChar, cyChar) ;
                  SetCaretPos (xCaret * cxChar, yCaret * cyChar) ;
                  ShowCaret (hwnd) ;
```

```
                    return 0 ;
```

WM_KILLFOCUS is invoked whenever the mouse cursor is moved outside of the rectangular dimensions of the displayed note. WM_KILLFOCUS removes the caret symbol created by WM_SETFOCUS.

```
         case WM_KILLFOCUS:
             HideCaret (hwnd) ;
         DestroyCaret () ;
         return 0 ;
```

WM_KEYDOWN captures various keyboard event keys such as cursor movement via the keyboard
cursor control keys, the Home key, the End (of line) key, etc.

```
         case WM_KEYDOWN:
             switch (wParam)
             {
                 case VK_HOME:
                     xCaret = 0 ;
                     break ;

case VK_END:
                     xCaret = cxBuffer - 1 ;
                     break ;

case VK_PRIOR:
                     yCaret = 0 ;
                     break ;

case VK_NEXT:
                     yCaret = cyBuffer - 1 ;
                     break ;

case VK_LEFT:
                     xCaret = max (xCaret - 1, 0) ;
                     break ;

case VK_RIGHT:
                     xCaret = min (xCaret + 1, cxBuffer - 1) ;
                     break ;

case VK_UP:
                     yCaret = max (yCaret - 1, 0) ;
                     break ;
```

```
                    case VK_DOWN:
                        yCaret = min (yCaret + 1, cyBuffer - 1) ;
                        break ;

case VK_DELETE:
                        for (x = xCaret ; x < cxBuffer - 1 ; x++)
                            BUFFER (x, yCaret) = BUFFER (x + 1, yCaret) ;

BUFFER (cxBuffer - 1, yCaret) = ' ' ;

HideCaret (hwnd) ;
                        hdc = GetDC (hwnd) ;

SelectObject (hdc,GetStockObject (NOTEFONT)) ;

(void) SetBkMode(hdc,OPAQUE);
                                    (void) SetBkColor(hdc,NOTECOLOR);
                                    (void)
        SetTextColor(hdc,GetSysColor(COLOR_WINDOWTEXT));
                                    TextOut (hdc, xCaret * cxChar, yCaret * cyChar,
        &BUFFER(xCaret, yCaret), cxBuffer - xCaret);

ShowCaret (hwnd) ;
                                    ReleaseDC (hwnd, hdc) ;
                                    break ;
                        }

Set displayed note's caret position to correspond to the keystroke made.
                        SetCaretPos (xCaret * cxChar, yCaret * cyChar) ;
                        return 0 ;

WM_CHAR captures any keyboard keystroke that results in a data character being input into
            a note. The various cases here handle basic editing control within the displayed note or, as the
            default
            action, places the input character within the display area of the visible note at the position of the
            caret within the displayed note.
                    case WM_CHAR:
                        for (i = 0 ; i < (int) LOWORD (lParam) ; i++)
                            {
                            switch (wParam)
                                {
            Handle the Backspace keystroke.
                                case '\b' :           // backspace
                                    if (xCaret > 0)
```

-29-

```
                        {
                        xCaret-- ;
                        SendMessage (hwnd, WM_KEYDOWN,VK_DELETE, 1L) ;
                        }
            break ;

Handle the Tab keystroke.
            case '\t' :             // tab
                    do
                    {
                            SendMessage (hwnd, WM_CHAR, ' ', 1L) ;
                    }
                    while (xCaret % 8 != 0) ;
                    break ;

Handle the Enter/Return keystroke.
            case '\n' :             // line feed
                    if (++yCaret == cyBuffer)
                            yCaret = 0 ;
                    break ;

Handle the Enter/Return keystroke.
            case '\r' :             // carriage return
                    xCaret = 0 ;
                    if (++yCaret == cyBuffer)
                            yCaret = 0 ;
                    break ;

Handle the Escape keystroke. [In this particular implementation, the Escape key closes a
displayed note, preserving any changes to its contents.]
            case '\x1B' :           // escape
                            PostMessage (hwnd, WM_DESTROY, 0, 0L) ;
                            return 0;

Handle the default keystroke input. It is this default case where actual data characters are
input into a displayed note.
            default:                // character codes
                    BUFFER (xCaret, yCaret) = (char) wParam ;

HideCaret (hwnd) ;
            hdc = GetDC (hwnd) ;

SelectObject (hdc,GetStockObject (NOTEFONT));
                    (void) SetBkMode(hdc,OPAQUE);
```

```
                        (void) SetBkColor(hdc,NOTECOLOR);
                        (void)
     SetTextColor(hdc,GetSysColor(COLOR_WINDOWTEXT));
                        TextOut (hdc, xCaret * cxChar, yCaret * cyChar,
     &BUFFER(xCaret, yCaret), 1);

ShowCaret (hwnd) ;
                ReleaseDC (hwnd, hdc) ;

if (++xCaret == cxBuffer)
                {
                                xCaret = 0 ;
                                if (++yCaret == cyBuffer)
                        yCaret = 0 ;
                }
            break ;
            }
        }
```

Set displayed note's caret position to correspond to the keystroke made.
```
            SetCaretPos (xCaret * cxChar, yCaret * cyChar) ;
            return 0 ;
```

WM_PAINT redraws the contents of a displayed note whenever the displayed note is partially or fully obscured by another window and that window is subsequently removed from view, essentially re-exposing any hidden sections of the (displayed) note.
```
        case WM_PAINT:
                hdc = BeginPaint (hwnd, &ps) ;
                SelectObject (hdc, GetStockObject (NOTEFONT)) ;
                (void) SetBkMode(hdc,OPAQUE);
                (void) SetBkColor(hdc,NOTECOLOR);
                (void) SetTextColor(hdc,GetSysColor(COLOR_WINDOWTEXT));
                for (y = 0 ; y < cyBuffer ; y++)
                        TextOut (hdc, 0, y * cyChar, &BUFFER(0,y), cxBuffer) ;
                EndPaint (hwnd, &ps) ;
                return 0 ;
```

WM_DESTROY removes the displayed note from the screen. The contents of the note is preserved in a memory area allocated as part of the note itself. The displayed contents of a note is merely a copy of this memory area.
```
        case WM_DESTROY:

DeleteObject(SetClassWord(hwnd,GCW_HBRBACKGROUND,GetStockObject(brush))
);
```

```
            PostMessage(hwnd,WM_QUIT,1,0L);
            return 0 ;
        }
    }
```

'notemem' allocates the memory needed for the array of structures pointed to
by the 'note' variable. This array of structures becomes the pool of note entries
that may be assigned individually to implement annotations.

```
int notemem(void) {
int i;
        for(notemax=N; notemax; notemax-=N/10) {
                note = GlobalAllocPtr(GHND,(notemax*sizeof(struct note)));
                if(note) break;
        }
        if(!note) return -1;
        for(i=0; i<notemax; ++i) {
                note[i].x = -1;
                note[i].n[0] = '\0';
        }
        return 0;
}
```

'noteget' searches for an available note entry in the array of notes.
Available entries are denoted by the value of a -1 in the x coordinate field
of the note structure (note[].x). The array index of an available note entry
is returned, else a -1 is returned, denoting no available notes.

```
int noteget(void) {
int i;
        for(i=0; i<notemax; ++i)
                if(note[i].x == -1) return i;
        return -1;
}
```

'noteput' marks a specified note entry as no longer in use. The note
to be so marked is specified by the parameter value of 'i'. A -1 is assigned
to the x coordinate value of the specified ith note entry to denote that it is no
longer in use.

```
void noteput(int i) {
        note[i].x = -1;
}
```

'noteclr' resets all active notes by assigning a -1 to the x coordinate value
of the note structure.

```
void noteclr(void) {
int i;
        for(i=0; i<notemax; ++i)
                note[i].x = -1;
        noteslct = -1;
}
```

Given a point coordinate p, consisting of a pair of whole numbers denoting an x,y coordinate, return the entry in the 'note' array whose coordinates of its corresponding upper-left corner come within 8 pels of the point coordinate p. This is the function of 'notefind'.

```
int notefind(POINT p) {
int i;
        for(i=0; i<notemax; ++i)
                if(note[i].x != -1)
                        if(p.x >= note[i].x)
                                if(p.x <= (note[i].x + 8))
                                        if(p.y >= note[i].y)
                                                if(p.y <= (note[i].y + 8))
                                                        return i;
        return -1;
}
```

'selectbox' draws a bounding box; a simple square. This is used to visually identify a selected note.

```
void selectbox(int select,HWND hwnd) {
extern void DrawSelect(HDC,BOOL,LPRECT);
HDC hdc;
RECT hilite;
        hilite.left = note[select].x - 2;
        hilite.top = note[select].y - 2;
        hilite.right = note[select].x + 8 + 2;
        hilite.bottom = note[select].y + 8 + 2;
        DrawSelect(hdc=GetDC(hwnd),0,&hilite);
        ReleaseDC(hwnd,hdc);
}
```

'addrlist' adds a (new) name and address to the next available rlist array entry.

```
void addrlist(struct routelist rlist, name, address) {
    rlist.index += 1;
    rlist.count += 1;
    rlist.group[index].name = name;
    rlist.group[index].address = address;
```

-33-

}

'delrlist' deletes an rlist array entry signified by the parameter 'index'.
The deletion is physical. The rlist array is physically moved to "squeeze"
out the deleted rlist entry if that entry is not the last one of the rlist.

```
void delrlist(struct routelist rlist, index) {
  if(index < rlist.count)
    for(int i=index; i<rlist.count-1; ++i) {
      rlist.group[i].name = rlist.group[i+1].name;
      rlist.group[i].address = rlist.group[i+1].address;
    }
  rlist.count -= 1;
}
```

'memrlist' allocates the memory for the routing list.
```
struct rlist *memrlist(void) {
struct routelist *r;
  r = malloc(sizeof(struct routelist));
  return r;
}
```

(FIGURE 14) The serial routing of the primary image and all annotations is done by
transmitting the primary image, annotation set, and routing list all to the next entry on
the routing list. Only the next recipient in the routing list would receive the transmission.
A count is kept of the total number of recipients in the list as well as an index to keep track of
the next recipient to receive the set. When the last recipient forwards their copy the index would
increment and be found to exceed the count, wherein the index, being reset to 0, would send
the set back to the originator. Hence, the zeroth entry of a routing list would be reserved
for an originator.

```
void sendserialroute(struct routelist rlist) {
CONNECTION c;
  rlist.index += 1;
  if(rlist.index > rlist.count) rlist.index = 0;
  c = openconnect(rlist.group[rlist.index].address);
  send(c,primary image);
  send(c,note set);
  send(c,rlist);
  close(c);
}
```

(FIGURE 15) The parallel routing of the primary image and all annotations is done by
transmitting the primary image, annotation set, and routing list to all entries on the routing list in a single procedure call. In parallel routing the set is effectively "broadcast" to all recipients of the routing list. The sending of the routing list is optional but facilitated to allow a recipient
an opportunity to see who the other receivers are.

```
void sendparallelroute(struct routelist rlist) {
   CONNECTION c;
   for(rlist.index =1; rlist.index<rlist.count; ++ rlist.index) {
      c = openconnect(rlist.group[rlist.index].address);
      send(c,primary image);
      send(c,note set);
      send(c,rlist);
      close(c);
   }
}
```

What is claimed is:

1. In a computing network comprising a plurality of computing systems with each computing system comprising display means for displaying an image, input means for data entry, data storage means, memory means, and an application program stored on the storage means, the program comprising means for capturing a selected portion of an image displayed on the display means for generating a primary image, means for generating a plurality of secondary images having distinguishable attributes, means for selecting at least one secondary image for positioning the secondary image on the generated primary image and for activating the secondary image, means for selecting desired secondary images positioned on the primary image for activating the secondary image for generating an annotatory data input and display region associated with the secondary image, the annotatory region for inputting annotatory data to annotate the primary image and for displaying annotatory data with an associated activated secondary image for viewing annotations to the primary image, means for selectively displaying and hiding annotatory regions so that the regions do not interfere with viewing the primary image, and means for selectively displaying and hiding secondary images positioned on the primary image, a method of superimposing a secondary image on a primary image for annotating the primary image and for routing the primary image through the computing network, the method comprising the steps of:

(1) invoking the application program for running the program;

(2) generating a display image on the display means;

(3) capturing a selected portion of the display image to generate a primary image;

(4) repeating step (3) for generating desired additional primary images;

(5) selecting a desired secondary image;

(6) positioning the selected secondary image on the primary image;

(7) activating the secondary image for generating the annotatory data input and display region of the associated secondary image;

(8) inputting annotatory data into the annotatory region;

(9) deactivating the associated secondary image for closing the annotatory data region of the associated secondary image;

(10) deselecting the secondary image;

(11) repeating steps (5) through (10) for each desired annotation to the primary image;

(12) generating a routing list of a plurality of users including a first user and subsequent users for transmitting at least one primary image from the first user to subsequent users in a predetermined sequence;

(13) transmitting at least one primary image from the first user to the subsequent users in the sequence prescribed by the routing list;

(14) notifying each subsequent user upon receipt of at least one primary image transmitted from the first user;

(15) upon notification of receipt of at least one primary image, a subsequent user invoking the application program stored on their computer for running the program to perform the following steps;

(16) calling a received primary image into memory for displaying the image on the display means;

(17) selecting a desired secondary image positioned on the primary image for activating the secondary image;

(18) activating the selected secondary image for generating the associated annotatory data region for displaying annotatory data in the region, the annotatory data in the region representative of annotations from the first user;

(19) deactivating the secondary image for closing the associated annotatory data region of the secondary image for hiding the annotatory data;

(20) deselecting the secondary image;

(21) repeating steps (17) through (20) for displaying desired annotations input by the first user;

(22) selecting a desired secondary image;

(23) positioning the selected secondary image on the primary image for activating the secondary image and activating the image for generating the associated annotatory data region for displaying annotatory data in the region;

(24) inputting additional annotatory data into the annotatory region to append the data to the annotatory data input by the first user;

(25) deactivating the associated secondary image for closing the annotatory data region for hiding the annotatory data and appended annotatory data from the primary image;

(26) deselecting the secondary image;

(27) repeating steps (22) through (26) for each desired appended annotation to the primary image;

(28) repeating steps (5) through (10) for each desired new annotation to the primary image;

(29) repeating steps (16) through (28) for each primary image received by the user; and

(30) transmitting each received and annotated primary image to a subsequent next user prescribed by the routing list.

2. The method of claim 1 wherein the next subsequent user is a selected one of the first user and a subsequent user determined by the routing list.

3. The method of claim 1 comprising the further steps of:

(31) transmitting at least one primary image from the first user to each subsequent user in parallel;

(32) repeating steps (16) through (28) for each primary image received by the user; and

(30) transmitting each received and annotated primary image back to the first user, the first user repeating steps (16) through (28) for each received and annotated primary image received thereby from the subsequent users for performing data manipulation as directed by the annotations input by the first user and subsequent users.

4. The method of claim 1 comprising the further steps of:

(31) transmitting at least one primary image from the first user to a first subsequent user;

(32) repeating steps (16) through (28) for each received and annotated primary image received by the first subsequent user;

(33) transmitting each received and annotated primary image from the first subsequent user to a next subsequent user;

(34) repeating steps (31) through (33) until a last subsequent user is transmitted each received and annotated primary image; and

(35) transmitting each received and annotated primary image from the last subsequent user to the first user, the first user repeating steps (16) through (28) for each received and annotated primary image received thereby from the last subsequent user for performing data manipulation as directed by the annotations input by the first user and subsequent users.

5. The method of claim 1 wherein an annotatory data comprises user generated data selected from the group consisting of a text data stream, a graphical animation data stream, an audio data stream, and a video data stream.

6. The method of claim 5 wherein the annotatory data is sorted by data selected from the group consisting of date of annotatory data input, time of annotatory data input, and author of annotatory data input.

7. In a computing network comprising a plurality of computing systems with each computing system comprising display means for displaying an image, input means for data entry, data storage means, memory means, and an application program stored on the storage means, the program comprising means for capturing a selected portion of an image displayed on the display means for generating a primary image, means for generating a plurality of secondary images having distinguishable attributes, a first type of secondary image comprising a simple graphic icon and a second type of secondary image comprising a pictographic icon, means for selecting at least one secondary image for positioning the secondary image on the generated primary image and for activating the secondary image, means for selecting desired secondary images positioned on the primary image for activating the secondary image for generating an annotatory data input and display region associated with the secondary image, the annotatory region for inputting annotatory data to annotate the primary image and for displaying annotatory data with an associated activated secondary image for viewing annotations to the primary image, means for selectively displaying and hiding annotatory regions so that the regions do not interfere with viewing the primary image, and means for selectively displaying and hiding secondary images positioned on the primary image, a method of superimposing a secondary image on a primary image for annotating the primary image and for routing the primary image through the computing network, the method comprising the steps of:

(1) invoking the application program for running the program;

(2) generating a display image on the display means;

(3) capturing a selected portion of the display image to generate a primary image;

(4) repeating step (3) for generating desired additional primary images;

(5) selecting a desired secondary image of a desired one of the first and second image types;

(6) positioning the selected secondary image on the primary image;

(7) activating the secondary image for generating the annotatory data input and display region of the associated secondary image;

(8) inputting annotatory data into the annotatory region;

(9) deactivating the associated secondary image for closing the annotatory data region of the associated secondary image;

(10) deselecting the secondary image;

(11) repeating steps (5) through (10) for each desired annotation to the primary image;

(12) generating a routing list of a plurality of users including a first user and subsequent users for transmitting at least one primary image from the first user to subsequent users in a predetermined sequence;

(13) transmitting at least one primary image from the first user to the subsequent users in the sequence prescribed by the routing list;

(14) notifying each subsequent user upon receipt of at least one primary image transmitted from the first user;

(15) upon notification of receipt of at least one primary image, a subsequent user invoking the application program stored on their computer for running the program to perform the following steps;

(16) calling a received primary image into memory for displaying the image on the display means;

(17) selecting a desired secondary image positioned on the primary image for activating the secondary image;

(18) activating the selected secondary image for generating the associated annotatory data region for displaying annotatory data in the region, the annotatory data in the region representative of annotations from the first user;

(19) deactivating the secondary image for closing the associated annotatory data region of the secondary image for hiding the annotatory data;

(20) deselecting the secondary image;

(21) repeating steps (17) through (20) for displaying desired annotations input by the first user;

(22) selecting a desired secondary image;

(23) positioning the selected secondary image on the primary image for activating the secondary image and activating the image for generating the associated annotatory data region for displaying annotatory data in the region;

(24) inputting additional annotatory data into the annotatory region to append the data to the annotatory data input by the first user;

(25) deactivating the associated secondary image for closing the annotatory data region for hiding the annotatory data and appended annotatory data from the primary image;

(26) deselecting the secondary image;

(27) repeating steps (22) through (26) for each desired appended annotation to the primary image;

(28) repeating steps (5) through (10) for each desired new annotation to the primary image;

(29) repeating steps (16) through (28) for each primary image received by the user; and

(30) transmitting each received and annotated primary image to a next user prescribed by the routing list.

8. The method of claim 7 wherein the next user is a selected one of the first user and a subsequent user determined by the routing list.

9. The method of claim 7 comprising the further steps of:

(31) transmitting at least one primary image from the first user simultaneously to each subsequent user;

(32) repeating steps (16) through (28) for each primary image received by the user; and

(30) transmitting each received and annotated primary image simultaneously back to the first user, the first user repeating steps (16) through (28) for each received and annotated primary image received thereby from the subsequent users for performing data manipulation as directed by the annotations input by the first user and subsequent users.

10. The method of claim 7 comprising the further steps of:

(31) transmitting at least one primary image from the first user simultaneously to a first subsequent user;

(32) repeating steps (16) through (28) for each received and annotated primary image received by the first subsequent user;

(33) transmitting each received and annotated primary image from the first subsequent user to a next subsequent user;

(34) repeating steps (31) through (33) until a last subsequent user is transmitted each received and annotated primary image; and

(35) transmitting each received and annotated primary image from the last subsequent user to the first user, the first user repeating steps (16) through (28) for each received and annotated primary image received thereby from the last subsequent user for performing data manipulation as directed by the annotations input by the first user and subsequent users.

11. The method of claim 7 further comprising:

the first type of secondary image comprises a glyph comprising a pictographic icon and the second type of secondary image comprises a mark comprises a non-intrusive, simple, generally rectangular icon, the secondary images provided with indicating means for indicating the position of the secondary image with respect to the primary image, the indicating means selected from the group consisting of shape of the secondary image, form thereof, color thereof, and animation of thereof;

the marks configured into a desired one of predefined sets and user created sets that comprise user defined associated meaning; and each glyph positioned on the primary image providing information about itself due to the position of the glyph and its form, each glyph positioned on the primary image activated to generate its associated annotatory region to enable a user to input annotatory data in the region for annotating the primary image with their own annotations.

12. The method of claim 7 comprising the further step of cyclically displaying and hiding selected secondary images on the primary image.

13. The method of claim 7 wherein an annotatory data comprises user generated data selected from the group consisting of a text data stream, a graphical animation data stream, an audio data stream, and a video data stream.

14. The method of claim 7 wherein the annotatory data is sorted by data selected from the group consisting of date of annotatory data input, time of annotatory data input, and author of annotatory data input.

* * * * *